US011582801B2

(12) United States Patent
Xue et al.

(10) Patent No.: US 11,582,801 B2
(45) Date of Patent: Feb. 14, 2023

(54) METHODS, APPARATUSES AND SYSTEMS FOR FLEXIBLE CHANNEL ACCESS IN SHARED SPECTRUM

(71) Applicant: QUALCOMM Incorporated, San Diego, CA (US)

(72) Inventors: Yisheng Xue, San Diego, CA (US); Xiaoxia Zhang, San Diego, CA (US); Chih-Hao Liu, San Diego, CA (US); Aleksandar Damnjanovic, Del Mar, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 17/117,502

(22) Filed: Dec. 10, 2020

(65) Prior Publication Data
US 2021/0185730 A1    Jun. 17, 2021

Related U.S. Application Data

(60) Provisional application No. 62/948,001, filed on Dec. 13, 2019.

(51) Int. Cl.
| | |
|---|---|
| *H04W 74/08* | (2009.01) |
| *H04W 72/04* | (2009.01) |
| *H04B 1/713* | (2011.01) |
| *H04W 16/14* | (2009.01) |

(52) U.S. Cl.
CPC ........ *H04W 74/0816* (2013.01); *H04B 1/713* (2013.01); *H04W 72/0453* (2013.01); *H04W 16/14* (2013.01)

(58) Field of Classification Search
None
See application file for complete search history.

(56) References Cited

U.S. PATENT DOCUMENTS

| | | | |
|---|---|---|---|
| 2018/0124770 A1* | 5/2018 | Yerramalli | H04W 72/0413 |
| 2019/0075563 A1* | 3/2019 | Babaei | H04W 72/10 |
| 2019/0075581 A1* | 3/2019 | Salem | H04W 16/14 |
| 2019/0190668 A1* | 6/2019 | Lei | H04L 5/0046 |
| 2021/0298080 A1* | 9/2021 | Wu | H04W 72/1263 |
| 2022/0131731 A1* | 4/2022 | Yang | H04L 27/26134 |
| 2022/0174699 A1* | 6/2022 | El Hamss | H04W 72/1268 |

OTHER PUBLICATIONS

International Search Report and Written Opinion—PCT/US2020/064547—ISA/EPO—Mar. 24, 2021.

\* cited by examiner

*Primary Examiner* — Gregory B Sefcheck
*Assistant Examiner* — Srinivasa R Reddivalam
(74) *Attorney, Agent, or Firm* — Liem T. Do

(57) ABSTRACT

Methods, systems, and devices for wireless communication are described. A wireless device may perform a listen before talk (LBT) procedure on a channel bandwidth using an energy detection (ED) threshold. The ED threshold being associated with a transmission bandwidth that is narrower than the channel bandwidth. The wireless device may also, responsive to a successful LBT procedure, transmit on the transmission bandwidth according to a frequency hopping pattern during a first channel occupancy time (COT). The frequency hopping pattern comprises a first resource allocation and a second resource allocation different from the first resource allocation.

26 Claims, 12 Drawing Sheets

METHODS, APPARATUSES AND SYSTEMS FOR FLEXIBLE CHANNEL ACCESS IN SHARED SPECTRUM

CLAIM OF PRIORITY UNDER 35 U.S.C. § 119

The present Application for Patent claims priority to U.S. Provisional Application No. 62/948,001 by Yisheng Xue et al., entitled "METHODS, APPARATUSES AND SYSTEMS FOR FLEXIBLE CHANNEL ACCESS IN SHARED SPECTRUM," filed Dec. 13, 2019, which is hereby incorporated by reference in its entirety as if fully set forth below and for all applicable purposes.

BACKGROUND

The following relates generally to wireless communication, and more specifically to methods, apparatuses, and systems for flexible channel access in a shared radio frequency spectrum (or shared spectrum).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In NR, it has been contemplated that the system will support some modes of communications over a shared spectrum or unlicensed radio frequency spectrum of a cellular network. In this regard, techniques and protocols for channel access, such as listen-before-talk (LBT), for a duration of time (e.g., transmission opportunity (TXOP) or channel occupancy time (COT)) have been developed to ensure fairness and coexistence among devices operating in the shared spectrum. However, new frequency bands, such as the 6 GHz band, are being considered for shared spectrum operation, and the current rules and protocols for channel access may not take advantage of the capabilities and performance of today's devices. Therefore, improved techniques for flexible channel access may be desirable.

SUMMARY

The described techniques relate to improved methods, systems, devices, and apparatuses that support flexible channel access in shared spectrum. In an aspect, a method of wireless communications includes performing a first listen before talk (LBT) procedure on a channel bandwidth using a first energy detection (ED) threshold, the first ED threshold being associated with a transmission bandwidth that is narrower than the channel bandwidth. The method also includes, responsive to a successful first LBT procedure, transmitting on the transmission bandwidth according to a frequency hopping pattern during a first channel occupancy time (COT), the frequency hopping pattern comprising a first resource allocation and a second resource allocation different from the first resource allocation.

In some aspects, a method of wireless communications includes determining a first set of parameters associated with operation in a shared spectrum, the set parameters being based on a first channel bandwidth, and performing a first listen before talk (LBT) procedure on a first channel bandwidth according to at least one parameter of the first set of parameters. The method further includes, responsive to a successful first LBT procedure, transmitting on the first channel bandwidth during a first channel occupancy time (COT) according to at least one other parameter of the first set of parameters.

In other aspects, a wireless device for wireless communications includes a processor, memory in electronic communication with the processor, and instructions stored in the memory. The instructions are executable by the processor to perform a first listen before talk (LBT) procedure on a channel bandwidth using a first energy detection (ED) threshold, the first ED threshold being associated with a transmission bandwidth that is narrower than the channel bandwidth. The instructions are also executable by the processor to, responsive to a successful first LBT procedure, transmit on the transmission bandwidth according to a frequency hopping pattern during a first channel occupancy time (COT), the frequency hopping pattern comprising a first resource allocation and a second resource allocation different from the first resource allocation.

In some aspects, a wireless device for wireless communications includes a processor, memory in electronic communication with the processor, and instructions stored in the memory. The instructions are executable by the processor to determine a first set of parameters associated with operation in a shared spectrum, the set parameters being based on a first channel bandwidth, and to perform a first listen before talk (LBT) procedure on a first channel bandwidth according to at least one parameter of the first set of parameters. The instructions are further executable to, responsive to a successful first LBT procedure, transmit on the first channel bandwidth during a first channel occupancy time (COT) according to at least one other parameter of the first set of parameters.

In some other aspects, a non-transitory computer-readable medium storing code for wireless communications is provided. The code includes instructions executable to perform a first listen before talk (LBT) procedure on a channel bandwidth using a first energy detection (ED) threshold, the first ED threshold being associated with a transmission bandwidth that is narrower than the channel bandwidth. The code further includes instructions executable to, responsive to a successful first LBT procedure, transmit on the transmission bandwidth according to a frequency hopping pattern during a first channel occupancy time (COT), the frequency hopping pattern comprising a first resource allocation and a second resource allocation different from the first resource allocation.

In some aspects, a non-transitory computer-readable medium storing code for wireless communications is provided. The code includes instructions executable to determine a first set of parameters associated with operation in a shared spectrum, the set parameters being based on a first channel bandwidth, and to perform a first listen before talk (LBT) procedure on a first channel bandwidth according to at least one parameter of the first set of parameters. The code further includes instructions executable to, responsive to a successful first LBT procedure, transmit on the first channel bandwidth during a first channel occupancy time (COT) according to at least one other parameter of the first set of parameters.

In other aspects, an apparatus for wireless communications includes means for means for performing a first listen before talk (LBT) procedure on a channel bandwidth using a first energy detection (ED) threshold, the first ED threshold being associated with a transmission bandwidth that is narrower than the channel bandwidth. The apparatus also includes, responsive to a successful first LBT procedure, means for transmitting on the transmission bandwidth according to a frequency hopping pattern during a first channel occupancy time (COT), the frequency hopping pattern comprising a first resource allocation and a second resource allocation different from the first resource allocation.

In some other aspects, an apparatus for wireless communications includes means for determining a first set of parameters associated with operation in a shared spectrum, the set parameters being based on a first channel bandwidth, and means for performing a first listen before talk (LBT) procedure on a first channel bandwidth according to at least one parameter of the first set of parameters. The apparatus further includes, responsive to a successful first LBT procedure, means for transmitting on the first channel bandwidth during a first channel occupancy time (COT) according to at least one other parameter of the first set of parameters.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Aspects of the disclosure are initially described in the context of a wireless communications system. Examples of techniques for long term channel sensing are described herein. Aspects of the disclosure are further illustrated by and described with reference to apparatus diagrams, system diagrams, flowcharts, and appendix that support various configurations of bandwidth parts in a shared spectrum.

Figure 1:
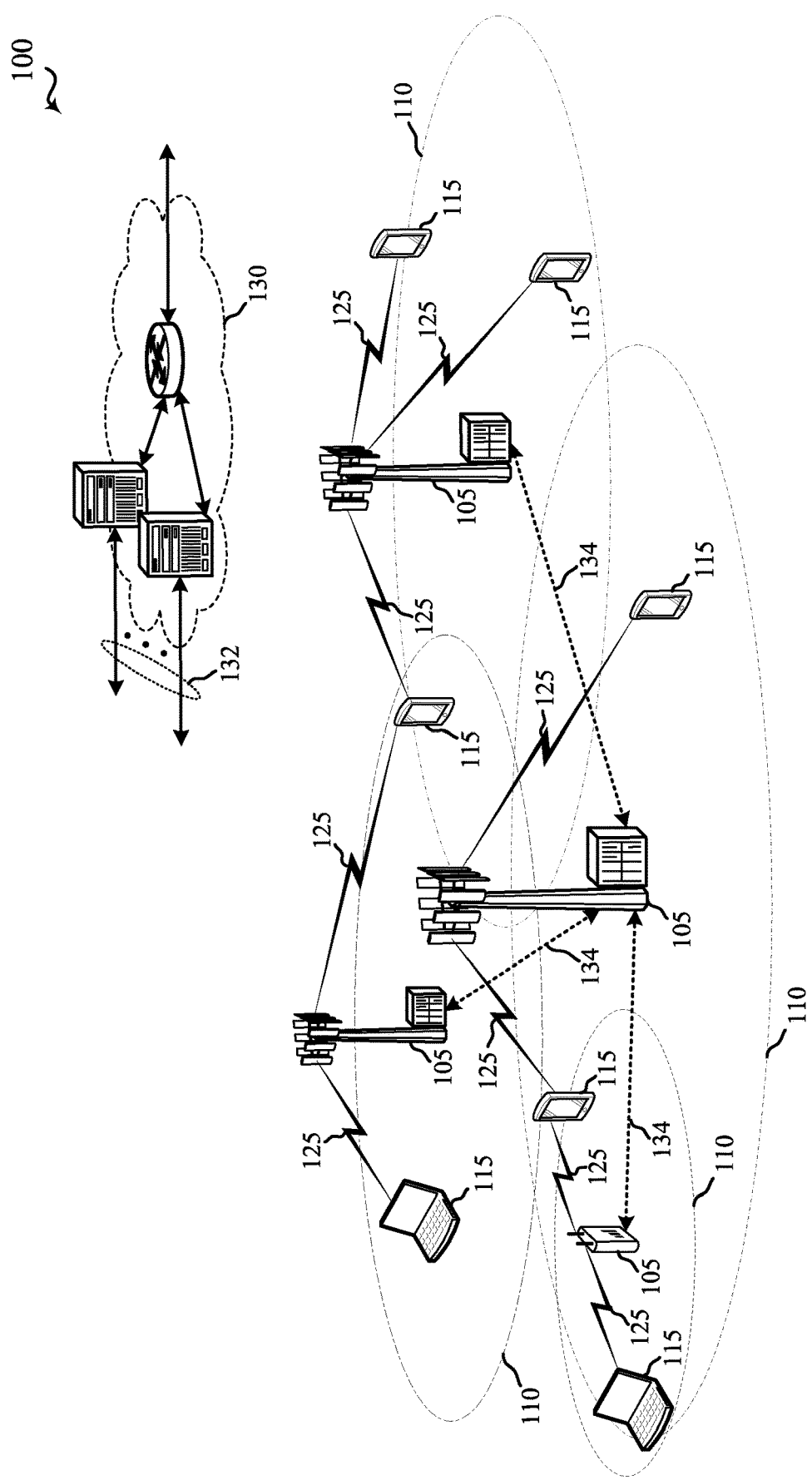
FIG. 1 illustrates an example of a system for wireless communication in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a New Radio (NR) network, a Long Term Evolution (LTE) network, or an LTE-Advanced (LTE-A) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. eMTC devices may build on MTC protocols and support lower bandwidths in the uplink or downlink, lower data rates, and reduced transmit power, culminating in significantly longer battery life (e.g., extending batter life for several years). References to an MTC may also refer to an eMTC configured device.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed (NR-U), such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Media Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some frequency bands (e.g., 5 GHz band), current regulations and protocols have been established for nodes/devices operating in a shared spectrum. For example, a node can access a 20 MHz channel after a successful LBT procedure over the 20 MHz, and may be required occupy at least 80% of the total 20 MHz bandwidth (referred to as an occupied channel bandwidth (OCB) requirement). In this regard, the current OCB requirement may be inefficient and inadequate for some type of services and/or devices such as ultra-reliable low latency communications (URLLC), MTC, IoT, IoE, and other narrow bandwidth type of services and/or devices. Additionally, some protocols may require performing the LBT procedure over a pre-defined primary channel of 20 MHz as a pre-requisite for wideband channel access which may be inefficient when there is congestion over the primary channel. Furthermore, today's devices are more capable of handling interference and coexisting with other devices operating in the shared spectrum. Accordingly, it may be desirable to develop new rules for some shared frequency spectrum bands (e.g., 6 GHz band) that efficiently support both wide and narrow bandwidth services and/or devices, and that take advantage of these advanced capabilities. Therefore, techniques for flexible channel access in the shared spectrum are described in detail below.

Figure 2:
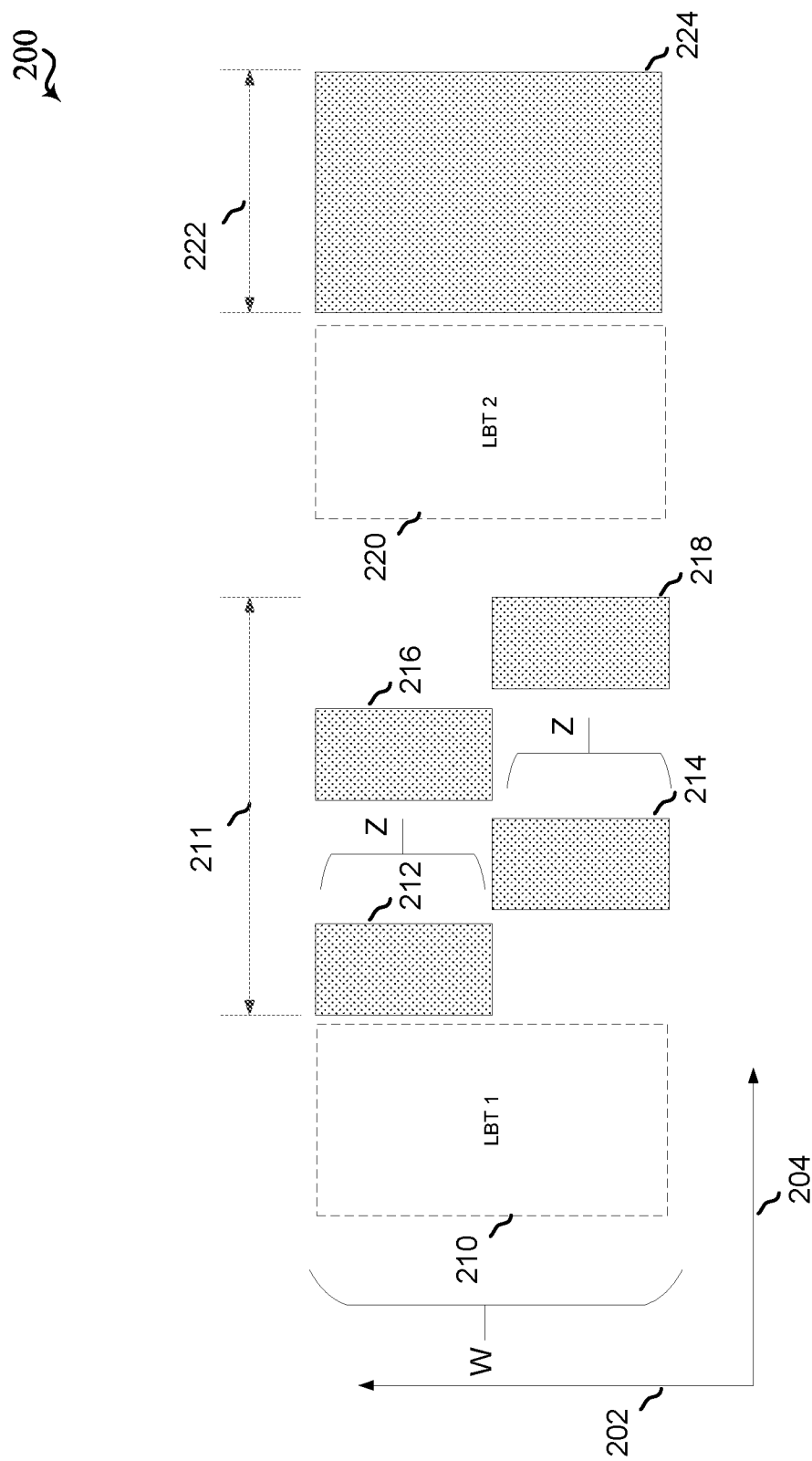
FIG. 2 illustrates an example of a channel access scheme for operating in a shared spectrum in accordance with aspects of the present disclosure.

FIG. 2 illustrates a diagram of a channel access scheme 200 for operating in a shared spectrum in accordance with the present disclosure. In some examples, the channel access scheme 200 may be employed by a wireless device, such as, a base station 105 and/or a UE 115 in the system 100 of FIG. 1. In an aspect, the channel access scheme 200 may be deployed in an NR system operating in the unlicensed spectrum which may be referred to as an NR-U system. In FIG. 2, the y-axis 202 represents frequency in some constant units and the x-axis 204 represents time in some constant units. The channel access scheme 200 may apply to frame based equipment (FBE) and/or load based equipment (LBE).

The channel access scheme 200 may implement an LBT procedure with an energy detection (ED) threshold and contention window (CW) that are based on an actual transmission bandwidth. For example, the wireless device may perform an LBT procedure 210 on a channel in the shared spectrum having a bandwidth W (channel bandwidth W). The LBT procedure 210 may be similar to a clear channel assessment (CCA) procedure and the like. The wireless device may use an ED threshold for the LBT procedure 210 to ensure that the channel is clear before transmitting. The LBT procedure 210 may be performed on the channel bandwidth W. The LBT procedure 210 may be deemed successful when the wireless device does not detect energy above the ED threshold during the CW (i.e., channel is idle). The LBT procedure 210 may be deemed unsuccessful when the wireless device detects energy above the ED threshold during the CW (i.e., channel is busy).

When the LBT procedure 210 is successful, the wireless device may transmit for a duration referred to as a channel occupancy time (COT) 211. The duration may also be referred to as a transmission opportunity. Here, the wireless device may transmit over a channel having a bandwidth Z (transmission bandwidth Z) in accordance with a frequency hopping pattern. As shown in FIG. 2, the transmission bandwidth Z may be narrower than the channel bandwidth W over which the LBT procedure 210 was performed on. The channel access scheme 200 may implement a relaxed OCB requirement in some scenarios. The wireless device may be required to occupy at least 80% of the channel bandwidth per an OCB requirement. However, the channel access scheme 200 may allow the wireless device to transmit on a bandwidth that is less than the OCB requirement when the transmission is performed with frequency hopping. Additionally, the ED threshold may be adjusted based on the transmission bandwidth Z as compared to an ED threshold that would be required for transmitting on the entire channel bandwidth W. For example, in the 5 GHz band, an ED threshold of −72 dBm is used for a 23 dBm node to access a 20 MHz channel. The channel access scheme 200 may allow the same 23 dBm node to access a 20 MHz channel using a higher ED threshold, such as −69 dBm, when the node transmits with frequency hopping over 10 MHz channels.

In an example, the LBT procedure 210 may be performed on the channel bandwidth W, where W is equal to 20 MHz (i.e., 20 MHz channel). The wireless device may transmit on an actual transmission bandwidth Z, where Z is equal to 10 MHz (i.e., 10 MHz channel). Accordingly, the wireless device may transmit in accordance with a frequency hopping pattern that includes resource allocations 212, 214, 216, 218 within the COT 211. Specifically, the wireless device may transmit on a first 10 MHz channel for a first time slot in the resource allocation 212, then switch to a second 10 MHz channel for a second time slot in the resource allocation 214, then switch to the first 10 MHz channel for a third time slot in the resource allocation 216, and finally switch to the second 10 MHz channel for a fourth time slot in the resource allocation 218. It is noted that the frequency hopping pattern in this example occupies the full 20 MHz bandwidth.

In some aspects, the wireless device may transmit with the same power limit (e.g., power spectral density (PSD) limit) on the 10 MHz transmission bandwidth as allowed for transmitting on the 20 MHz channel bandwidth. For example, in the 5 GHz band, a PSD limit of 23 dBm may apply to 20 MHz channels. Here, the channel access scheme 200 may apply the same PSD limit of 23 dBm for 20 MHz channels as well as for 10 MHz channels when frequency hopping is implemented as shown in FIG. 2. In some other aspects, a different PSD limit for the transmit power may be applied to different channel bandwidths regardless of whether frequency hopping is employed or not.

It is noted that the channel bandwidth of 20 MHz, the transmission bandwidth of 10 MHz, and the frequency hopping pattern described above are mere examples and that other bandwidth configurations and frequency hopping patterns may be employed as well. For example, a channel bandwidth of 20 MHz may be partitioned into four 5 MHz transmission bandwidths with a frequency hopping pattern that hops across all four 5 MHz channels within a COT. Additionally, the frequency hopping pattern may occupy a portion of the channel bandwidth W instead of the full channel bandwidth as is shown in FIG. 2. Accordingly, the ED threshold used in such a frequency hopping pattern may be larger than the one used in a frequency hopping pattern that occupies the full channel bandwidth. Furthermore, there may be scenarios where the transmission bandwidth Z is much smaller than the channel bandwidth W (e.g., Z/W<0.05). In such a scenario, the wireless device may be exempt from performing the LBT procedure. In other words, the wireless device may skip the LBT procedure prior to transmission.

In some aspects, the wireless device may not employ frequency hopping in a another transmission opportunity. In this regard, the wireless device may perform an LBT procedure 220 on a channel bandwidth W. The LBT procedure 220 may be similar to the LBT procedure 210 except for an ED threshold and CW size. Here, the wireless device may intend to transmit on the entire channel bandwidth W without frequency hopping. Accordingly, the ED threshold and CW size used for the LBT procedure 220 may be associated with a transmission bandwidth W (instead of the transmission bandwidth Z with frequency hopping). As previously discussed above, in the 5 GHz band, a 23 dBm node may use an ED threshold of −72 dBm to access a 20 MHz channel.

The LBT procedure 220 may be deemed successful when the wireless device does not detect energy above the ED threshold during the CW (i.e., channel is idle). The LBT procedure 220 may be deemed unsuccessful when the wireless device detects energy above the ED threshold during the CW (i.e., channel is busy). When the LBT procedure 220 is successful, the wireless device may transmit for a COT 222. Here, the wireless device may transmit over a transmission bandwidth 224 (same as the channel bandwidth W). In some aspects, the COT 222 may be based on the LBT procedure 220 and/or the transmission bandwidth 224, and thus, may have a different duration than the COT 211. In other aspects, the COT 222 may have the same duration as the COT 211. The channel access scheme 200 may provide flexibility to support both wide and narrow bandwidth type services and/or devices in the shared spectrum.

In some aspects, the wireless device may modify the LBT procedure (e.g., LBT procedure 210, 220) and/or the frequency hopping pattern (e.g., resource allocations 212, 214, 216, 218). The wireless device may determine whether a collision has occurred with respect to at least one transmission associated with the resource allocations 212, 214, 216, 218. The wireless device may receive HARQ feedback (e.g., ACK or NACK) associated with each transmission corresponding to the resource allocations 212, 214, 216, 218. The wireless device may detect that a collision has occurred if it receives a NACK on any one of the transmissions associated with the resource allocations 212, 214, 216, 218. Accordingly, the wireless device may adjust the CW size used for the LBT procedure in a subsequent transmission opportunity. For example, the CW size may be increased (i.e., doubled CW). In another aspect, the wireless device may modify the frequency hopping pattern for a subsequent transmission opportunity if it has detected a collision. In one example, the frequency hopping pattern may employ the same transmission bandwidth Z but change the hopping location (e.g., channel location). In another example, the frequency hopping pattern may employ a different transmission bandwidth than the transmission bandwidth Z and also change the hopping location (e.g., channel location).

In an aspect, the wireless device may be a base station (e.g., base station 105 in FIG. 1) and may transmit downlink signals such as discovery reference signal (DRS), synchronization signal block (SSB), demodulation reference signal (DM-RS), physical broadcast channel (PBCH), physical downlink control channel (PDCCH), physical downlink shared channel (PDSCH), and the like. The base station may perform a category 4 (CAT4) LBT procedure (e.g., LBT procedure 210) associated with a base station initiated COT (e.g., COT 210). The base station may assign the resource allocations 212, 214, 216, 218 to a single UE (e.g., downlink with frequency hopping) or may assign the resource allocations to different UEs (e.g., resource allocation 212 and 216 assigned to UE1; resource allocation 214 and 218 assigned to UE2). The resource allocations 212, 214, 216, 218 may be associated with a scheduled downlink assignment or a semi-persistent downlink assignment. In this regard, the base station may signal the frequency hopping pattern to the one or more UEs via downlink control information (DCI) message, radio resource control (RRC) message, or medium access control-control element (MAC-CE).

In another aspect, the wireless device may be a UE (e.g., UE 115 in FIG. 1) and may transmit uplink signals such as physical uplink control channel (PUCCH), physical uplink shared channel (PUSCH), physical random access channel (PRACH), demodulation reference signal (DM-RS), sounding reference signal (SRS), scheduling request (SR), and the like. The UE may perform a CAT4 LBT for an uplink transmission associated with a UE initiated COT. Alternatively, the UE may perform a CAT2 LBT for an uplink transmission associated with a shared base station initiated COT. For example, the uplink transmission may correspond to a dynamically scheduled PUSCH. In another example, the uplink transmission may correspond to a configured-grant PUSCH. In yet another example, the UE may perform a CAT4 or CAT2 LBT procedure for a side-link channel access. It is noted that the ED threshold used for the LBT procedure may be under the control of the serving base station and may be signaled to the UE via a DCI message, RRC message, or MAC-CE.

Figure 3:
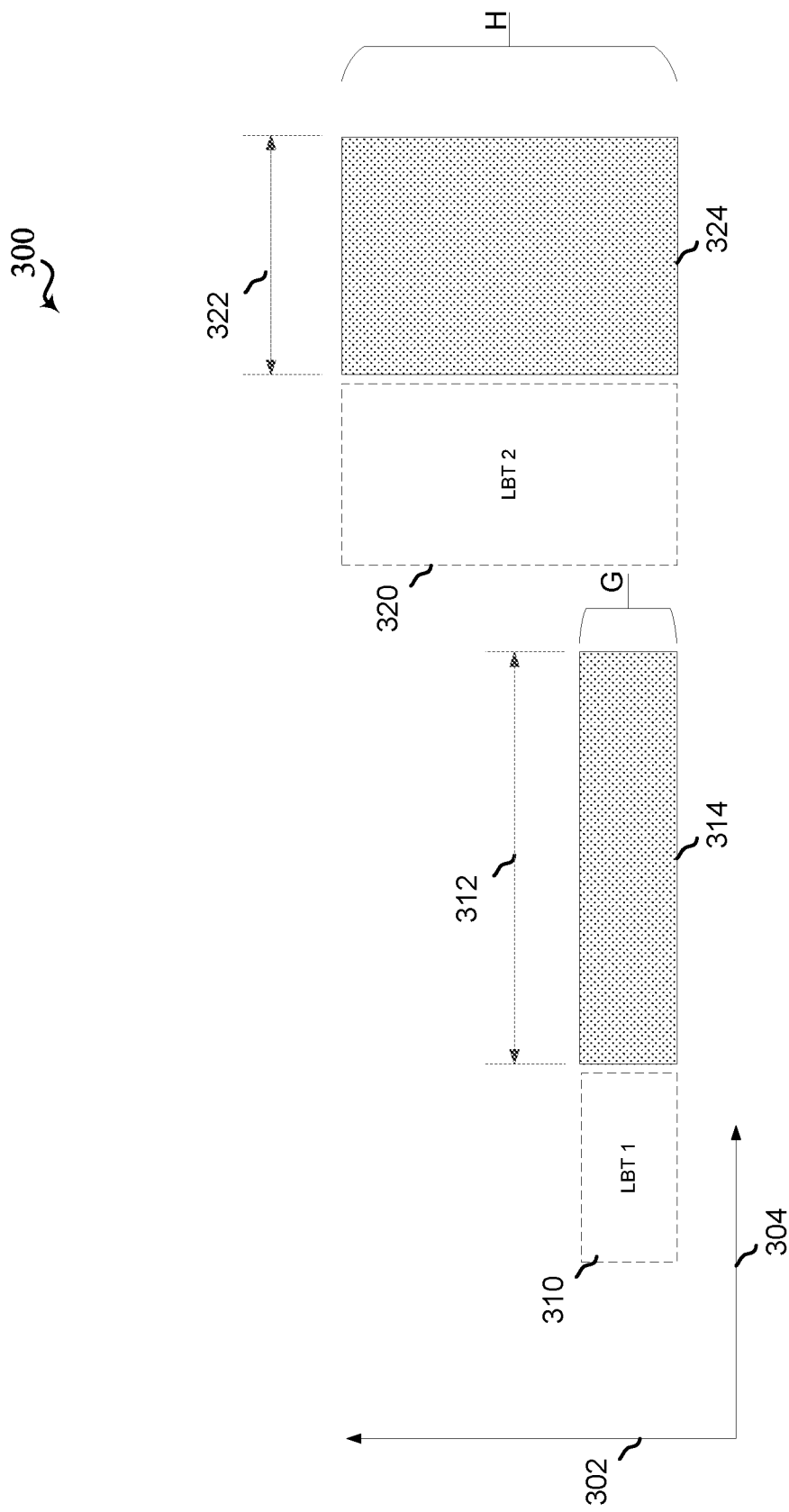
FIG. 3 illustrates an example of a channel access scheme for operating in a shared spectrum in accordance with aspects of the present disclosure.

FIG. 3 illustrates a diagram of a channel access scheme 300 for operating in a shared spectrum in accordance with the present disclosure. In some examples, the channel access scheme 300 may be employed by a wireless device, such as, a base station 105 and/or a UE 115 in the system 100 of FIG. 1. In an aspect, the channel access scheme 300 may be deployed in an NR system operating in the unlicensed spectrum which may be referred to as an NR-U system. In FIG. 3, the y-axis 302 represents frequency in some constant units and the x-axis 304 represents time in some constant units. The channel access scheme 300 may apply to frame based equipment (FBE) and/or load based equipment (LBE). The channel access scheme 300 may employ one or more parameters that are dependent on the channel bandwidth. In one aspect, a parameter may include a duration of a COT associated with a successfully LBT procedure. In another aspect, a parameter may include a CW size used for an LBT procedure.

For example, a wireless device may perform the LBT procedure over the channel bandwidth using an ED threshold and CW prior to transmitting in the channel. The wireless device may randomly select a number of slots (e.g., backoff counter) associated with the CW. The CW may have a range between a minimum number of slots (e.g., CWmin) and a maximum number of slots (e.g., CWmax). The CW may be set to CWmin for the first transmission attempt, and may be increased (e.g., doubled) after each failed attempt until it reaches CWmax. The LBT procedure may be deemed successful (i.e., channel is idle) when the wireless device does not detect energy above the ED threshold during the selected number of slots in the CW (e.g., backoff counter has expired). When the LBT procedure is successful, the wireless device may transmit during a COT. The LBT procedure may be deemed unsuccessful (i.e., channel is busy) when the wireless device detects energy above the ED threshold during the selected number of slots in the CW (e.g., backoff counter has not expired). When the LBT procedure is unsuccessful, the wireless device may increase the CW (up to CWmax) and perform another LBT procedure.

Here, the wireless device may perform an LBT procedure 310 on a channel in the shared spectrum having a bandwidth G (channel bandwidth G). The LBT procedure 310 may be similar to a clear channel assessment (CCA) procedure and the like. The wireless device may use an ED threshold and CW for the LBT procedure 310 to ensure that the channel is clear before transmitting. The wireless device may select the CW based on the channel bandwidth G. In an example, for G=20 MHz, the wireless device may select a CWmin equal to 15 (e.g., number of slots). Accordingly, the CW for the LBT procedure 310 in the first transmission attempt on the 20 MHz channel may be set to CWmin of 15. The LBT procedure 310 may be performed as discussed above, and when successful, the wireless device may transmit 314 for a COT 312. The COT 312 may also be based on the channel bandwidth G. In this example, for G=20 MHz, the COT 312 duration may be equal to 6 ms (e.g., 6 ms-COT).

In another transmission attempt, the wireless device may perform an LBT procedure 320 on a channel in the shared spectrum having a bandwidth H (channel bandwidth H). The LBT procedure 320 may be similar to the LBT procedure 310 except for the CW and COT. The wireless device may select the CW based on the channel bandwidth H. In an example, for H=60 MHz, the wireless device may select a CWmin equal to 5 (e.g., number of slots). Accordingly, the CW for the LBT procedure 320 in the first transmission attempt on the 60 MHz channel may be set to CWmin of 5. The LBT procedure 320 may be performed as discussed above, and when successful, the wireless device may transmit 324 for a COT 322. The COT 322 may be based on the channel bandwidth H. In this example, for H=60 MHz, the COT 322 duration may be equal to 2 ms (e.g., 2 ms-COT).

In some aspects, the wireless device may maintain respective CWs for the different channel bandwidths G and H. Additionally, the wireless device may have a maximum number of failed transmission attempts before the wireless device can switch its channel access over a narrower bandwidth. For example, the wireless device may attempt the LBT procedure over the channel bandwidth H, and may have reached a maximum number of failed attempts. Accordingly, the wireless device may switch its channel access over the channel bandwidth G. In this regard, the wireless device may continue with the LBT procedure instead of resetting the CW to the CWmin associated with the channel bandwidth H. In some other aspects, the wireless device may switch its channel access over a wider bandwidth when it has successfully checked out a number of COTs within a predefined time interval. In an example, the wireless device may have successfully performed transmissions (e.g., transmission 314) on the channel bandwidth G for a number of COTs (e.g., COT 312) within a predefined time interval. Therefore, the wireless device may switch its channel access over the wider channel bandwidth H.

In an aspect, the wireless device may be a base station (e.g., base station 105 in FIG. 1) and may transmit downlink signals (e.g., 314 and 324) such as DRS, SSB, DM-RS, PBCH, PDCCH, PDSCH, and the like. The base station may perform a CAT4 LBT procedure (e.g., LBT procedure 310 and 320) associated with a base station initiated COT (e.g., COT 312 and 322).

In another aspect, the wireless device may be a UE (e.g., UE 115 in FIG. 1) and may transmit uplink signals (e.g., transmission 314 and 324) such as PUCCH, PUSCH, PRACH, DM-RS, SRS, SR, and the like. The UE may perform a CAT4 LBT procedure (e.g., LBT procedure 310 and 320) for an uplink transmission associated with a UE initiated COT (e.g., COT 312 and 322). For example, the uplink transmission may correspond to a dynamically scheduled PUSCH. In another example, the uplink transmission may correspond to a configured-grant PUSCH. In yet another example, the UE may perform a CAT4 or CAT2 LBT procedure for a side-link channel access. It is noted that the bandwidth dependent parameters associated with the LBT procedure may be under the control of the serving base station and may be signaled to the UE via a DCI message, RRC message, or MAC-CE.

It is noted that the values specified for CWmin and COT duration in FIG. 3 are mere examples and that other values may be employed as well. Additionally, other parameters such as the ED threshold and OCB requirement may be dependent on the channel bandwidth. Furthermore, the bandwidth dependent parameters such as CWmin, COT duration, ED threshold, OCB requirement, and the like, may be specified by local regulation for operating in a particular shared frequency band.

Figure 4:
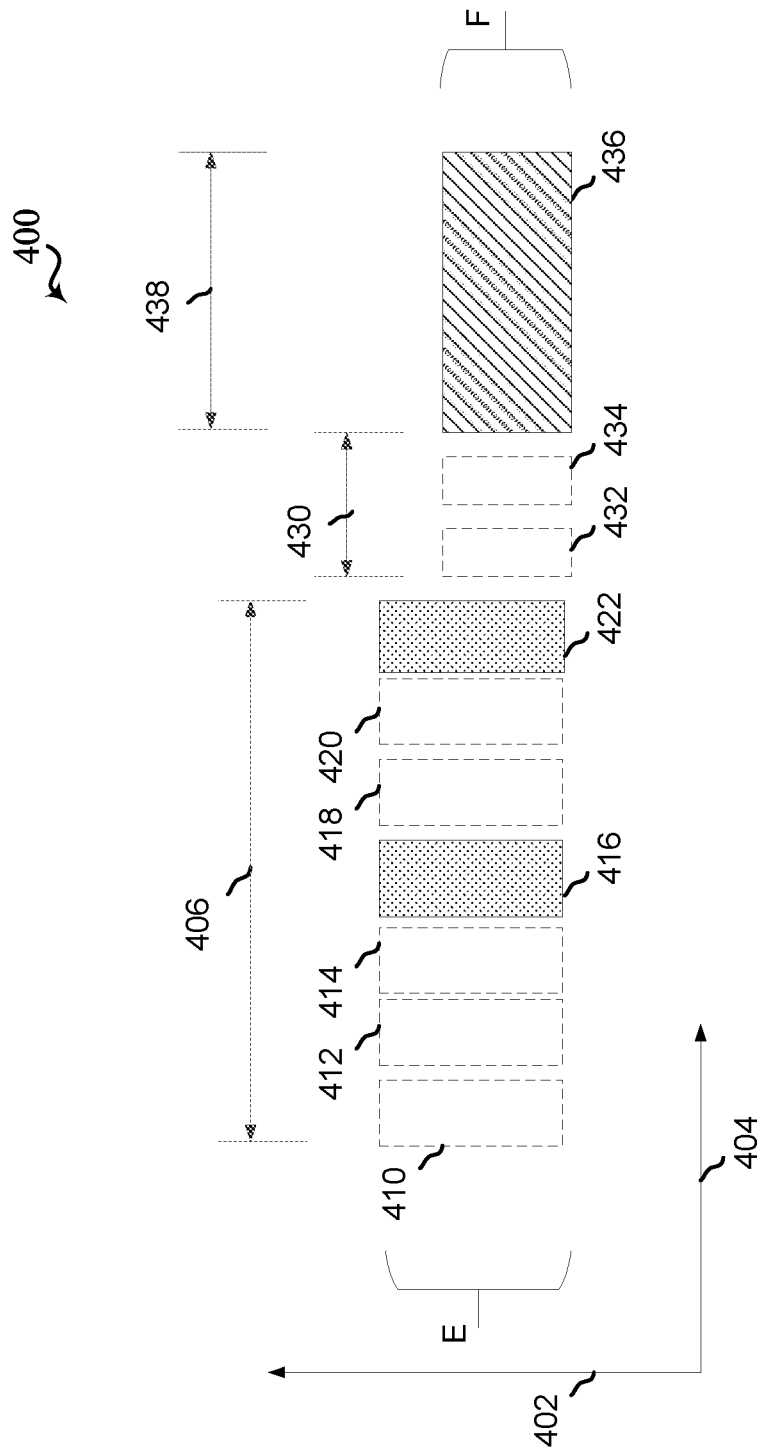
FIG. 4 illustrates an example of a channel access scheme for operating in a shared spectrum in accordance with aspects of the present disclosure.

FIG. 4 illustrates a diagram of a channel access scheme 400 for operating in a shared spectrum in accordance with the present disclosure. In some examples, the channel access scheme 400 may be employed by a wireless device, such as, a base station 105 and/or a UE 115 in the system 100 of FIG. 1. In an aspect, the channel access scheme 400 may be deployed in an NR system operating in the unlicensed spectrum which may be referred to as an NR-U system. In FIG. 4, the y-axis 402 represents frequency in some constant units and the x-axis 404 represents time in some constant units. The channel access scheme 400 may apply to frame based equipment (FBE) and/or load based equipment (LBE).

The channel access scheme 400 may employ a switching mechanism for transmitting on different channel bandwidths. In an aspect, the channel access scheme 400 may provide a fallback mode of operation when a wireless device has detected a predetermined number of busy slots during an LBT procedure as described in detail below.

Here, the channel access scheme 400 may enable the wireless device to transmit over two different channel bandwidths E and F, where channel bandwidth E has a wider bandwidth than channel bandwidth F. In one example, the channel bandwidth E may be 60 MHz, and the channel bandwidth F may be 20 MHz. The wireless device may perform an LBT procedure 406 over the channel bandwidth E. As previously described, the wireless device may use an ED threshold and may set a CW based on the channel bandwidth for the LBT procedure 406. The wireless device may randomly select a backoff counter. The LBT procedure 406 may begin with an interval 410 (e.g., DCF Interframe Space (DIFS) per IEEE 802.11 standards) in which the wireless device may be required to sense that the channel is continuously idle before starting the backoff counter.

In this example, the wireless device has determined that the channel is idle during the interval 410, and may begin the backoff counter at a slot 412. The wireless device may sense that the channel is idle in the slot 412 (e.g., idle slot), and thus, may decrement the backoff counter (i.e., countdown). The wireless device does the same in a slot 414 (e.g., idle slot) as the slot 412 since the wireless device senses that the channel is idle. In a slot 416, the wireless device may detect energy above the ED threshold (e.g., busy slot), and thus may not decrement the backoff counter. After a busy slot (e.g., slot 416), the wireless device may be required to sense that the channel is continuously idle for an interval 418 (e.g., DIFS) before restarting the backoff counter. The wireless device may determine that the channel is idle during the interval 418, and may restart the backoff counter at a slot 420. The wireless device may sense that the channel is idle in the slot 420 (e.g., idle slot), and thus may decrement the backoff counter. In a slot 422, the wireless device may detect that the channel is busy (e.g., busy slot), and may not decrement the backoff counter.

The channel access scheme 400 may provide a fallback mode when the wireless device has detected a predetermined number of busy slots (e.g., two busy slots 416 and 422) during an LBT procedure (e.g., LBT procedure 406). Accordingly, the wireless node may switch from the channel bandwidth E and to the channel bandwidth F. The wireless device may perform an LBT procedure 430, and may restart the backoff counter instead of having to reset the CW to a CWmin associated with an initial attempt on the channel bandwidth F. After a busy slot (e.g., slot 422), the wireless device may be required to sense that the channel is continuously idle for an interval 432 (e.g., DIFS) before restarting the backoff counter. The wireless device may determine that the channel is idle during the interval 432, and may restart the counter at a slot 434. The wireless device may sense that the channel is idle in slot 434, and thus decrement the backoff counter. In this example, the backoff counter has expired (e.g., countdown=0), and thus, the wireless device may transmit 436 on the channel bandwidth F for a COT 438. The COT 438 duration may dependent on the channel bandwidth F. It is noted that the wireless device may use a different ED threshold for the LBT procedure 430 than the ED threshold used for the LBT procedure 406. Alternatively, the wireless device may use the same ED threshold for the LBT procedures 406 and 430. It is noted the LBT procedures 406 and 430 may be considered as a single LBT procedure associated with the fallback mode of operation.

In an aspect, the wireless device may be a base station (e.g., base station 105 in FIG. 1) and may transmit downlink signals (e.g., transmission 436) such as DRS, SSB, DM-RS, PBCH, PDCCH, PDSCH, and the like. In another aspect, the wireless device may be a UE (e.g., UE 115 in FIG. 1) and may transmit uplink signals (e.g., transmission 436) such as PUCCH, PUSCH, PRACH, DM-RS, SRS, SR, and the like. It is noted that the fallback mode may be under the control of the serving base station and may be activated/deactivated via a DCI message, RRC message, or MAC-CE.

It is noted that the channel access scheme (e.g., channel access schemes 200, 300, 400 in FIGS. 2, 3, and 4, respectively) may be allowed in periodic windows when channel access in the shared spectrum is specified with a universal clock. That is, channel access may be synchronized across all the devices operating in the shared spectrum, and thus, the various channel access schemes described herein may be enabled at periodic windows. Further, different combinations of the channel access schemes may be employed. For example, the channel access scheme 400 in FIG. 4 may be implemented as a fallback mode in the channel access schemes 200, 300 in FIGS. 2 and 3, respectively. In another example, the bandwidth dependent parameters associated with the channel access scheme 300 in FIG. 3 may be used in the channel access scheme 200 in FIG. 2.

Figure 5:
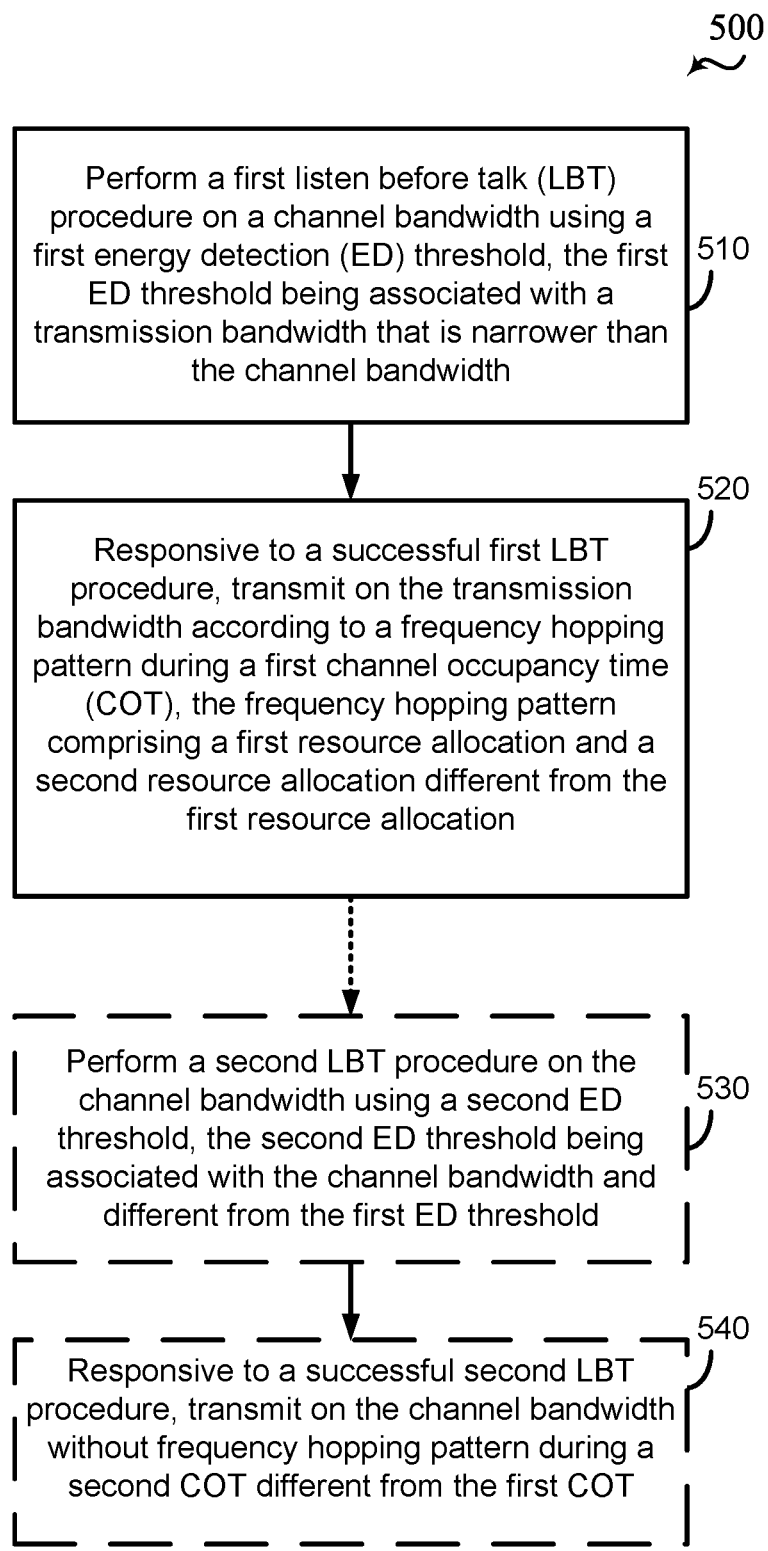
FIGS. 5-7 illustrate block flow diagrams of methods for supporting flexible channel access in a shared spectrum in accordance with aspects of the present disclosure.
Figure 6:
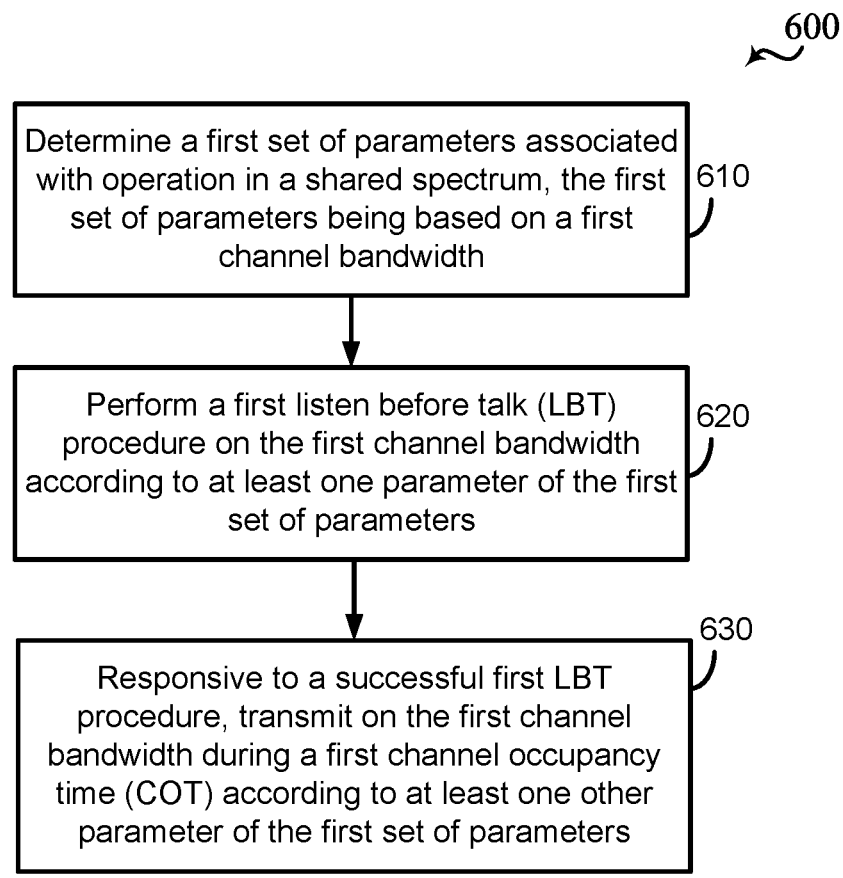
Figure 7:
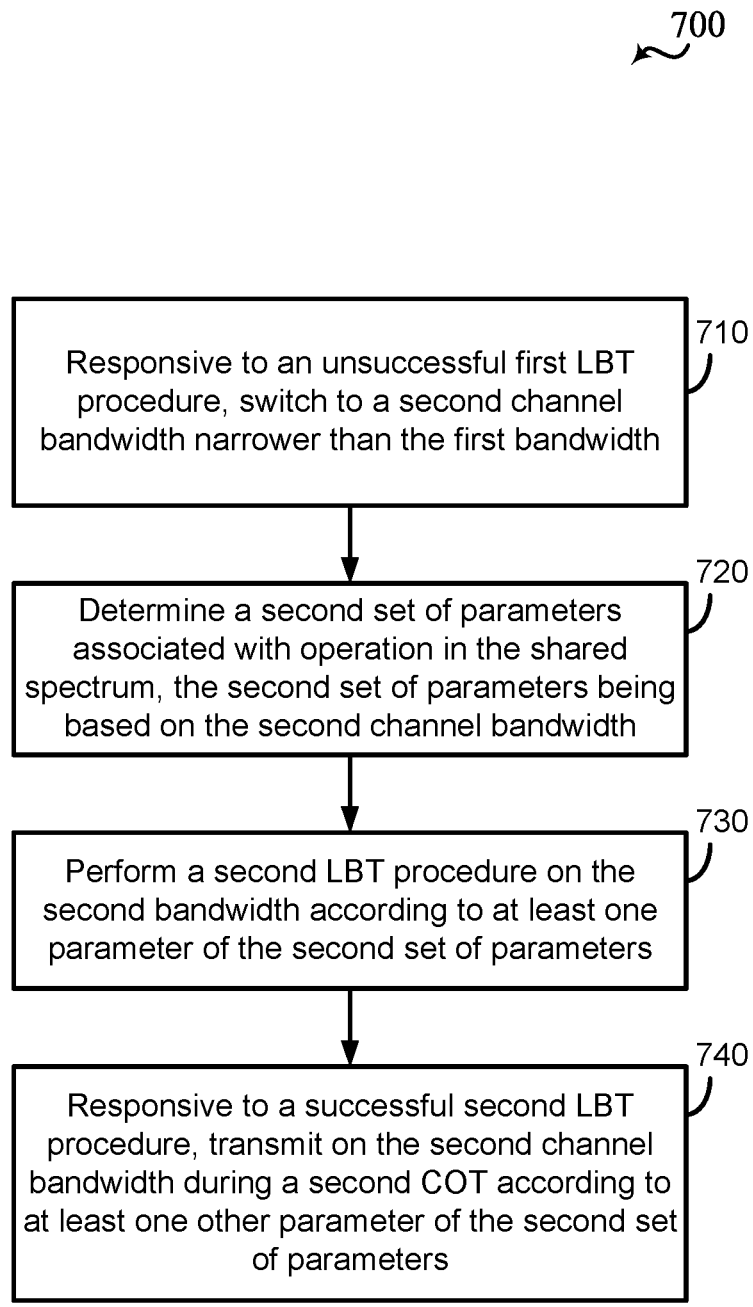

FIGS. 5-7 illustrate block flow diagrams of methods for supporting flexible channel access in a shared spectrum in accordance with the present disclosure. The methods of FIGS. 5-7 may be described with reference to FIGS. 1-4 and may use the same reference numerals for ease of discussion.

In FIG. 5 a method 500 for supporting flexible channel access in a shared spectrum is provided. The operations of the method 500 may be implemented by a UE 115 or its components as described herein with reference to FIGS. 11-12. In some examples, a UE 115 may execute a set of codes to control the functional elements of the device to perform the functions described below. Additionally, the UE 115 may perform aspects of the functions described below using special-purpose hardware. Alternatively, the operations of the method 500 may be implemented by a base station 105 or its components as described herein with reference to FIGS. 9-10. In some examples, a base station 105 may execute a set of codes to control the functional elements of the device to perform the functions described below. Additionally, the base station 105 may perform aspects of the functions described below using special-purpose hardware.

At block 510, a wireless device (e.g., base station 105 or UE 115) may perform a first listen before talk (LBT) procedure on a channel bandwidth using a first energy detection (ED) threshold. In an aspect, the first ED threshold may be associated with a transmission bandwidth that is narrower than the channel bandwidth. The operations of block 510 may be performed according to the methods described herein. In some examples, the wireless device may perform an LBT procedure such as a CAT4 LBT procedure over the channel bandwidth (e.g., channel bandwidth W). The LBT procedure (e.g., LBT procedure 210) may use an ED threshold associated with a transmission bandwidth (e.g., transmission bandwidth Z in FIG. 2) that is narrower than the channel bandwidth W.

At block 520, the wireless device may, responsive to a successful first LBT procedure, transmit on the transmission bandwidth according to a frequency hopping pattern during a first channel occupancy time (COT). In an aspect, the frequency hopping pattern may comprise at least a first resource allocation and a second resource allocation different from the first resource allocation. The operations of block 520 may be performed according to the methods described herein. In some examples, the wireless device may transmit on the transmission bandwidth for a first COT (e.g., COT 211) when the first LBT procedure is successful. The transmission may be performed according to a frequency hopping pattern (e.g., resource allocation 212, 214, 216, 218). In an aspect, the frequency hopping pattern may occupy the entire channel bandwidth W. In other aspects, the frequency hopping pattern may occupy a portion of the channel bandwidth W.

In some other examples, the wireless device may modify the frequency hopping pattern for a subsequent transmission opportunity. The wireless device may detect that a collision has occurred based on decoding results (e.g., HARQ feedback) associated with the transmission (e.g., resource allocation 212, 214, 216, 218). In an aspect, the frequency hopping pattern may be modified by changing the hopping location (e.g., frequency location) of the resource allocation. In another aspect, the frequency hopping pattern may be modified by changing the transmission bandwidth and hopping location of the resource allocation. In some examples, the wireless device may adjust the CW for the LBT procedure when the wireless device has detected a collision. In an aspect, the CW may be doubled when a collision has been detected.

At block 530, the wireless device may perform a second LBT procedure on the channel bandwidth using a second ED threshold. In an aspect, the second ED threshold may be associated with the channel bandwidth and different from the first ED threshold. The operation of block 530 may be performed according to the methods described herein. It is noted that block 530 may be optional for the method 500 as represented by the dashed line. In some examples, the wireless device may perform an LBT procedure such as a CAT4 LBT procedure over the channel bandwidth (e.g., channel bandwidth W). The LBT procedure (e.g., LBT procedure 220) may use an ED threshold associated with the channel bandwidth W which may be different from an ED threshold associated with the transmission bandwidth Z (in block 510). In an aspect, the first ED threshold may be greater than the second threshold.

At block 540, the wireless device may, response to a successful second LBT procedure, transmit on the channel bandwidth without frequency hopping during a second COT different from the first COT. The operations of block 540 may be performed according to the methods described herein. It is noted that block 540 may be optional for the method 500 as represented by the dashed line. In some examples, the wireless device may transmit on the channel bandwidth W for a second COT (e.g., COT 222) when the second LBT procedure is successful. The transmission over the channel bandwidth W (e.g., transmission bandwidth 224) may be performed without frequency hopping. In an aspect, the second COT may have a different duration than the first COT (in block 520).

In FIG. 6, a method 600 for supporting flexible channel access in a shared spectrum is provided. The operations of the method 600 may be implemented by a UE 115 or its components as described herein with reference to FIGS. 11-12. In some examples, a UE 115 may execute a set of codes to control the functional elements of the device to perform the functions described below. Additionally, the UE 115 may perform aspects of the functions described below using special-purpose hardware. Alternatively, the operations of the method 600 may be implemented by a base station 105 or its components as described herein with reference to FIGS. 9-10. In some examples, a base station 105 may execute a set of codes to control the functional elements of the device to perform the functions described below. Additionally, the base station 105 may perform aspects of the functions described below using special-purpose hardware.

At block 610, a wireless device (e.g., UE 115 or base station 105) may determine a first set of parameters associated with operation in a shared spectrum. In an aspect, the first set of parameters may be based on a first channel bandwidth. The operations of block 610 may be performed according to the methods described herein. In some examples, the wireless device may determine one or more parameters associated with an LBT procedure (e.g., LBT procedure 310, 320) and a COT duration (e.g., COT 312, 322). The one or more parameters may be dependent on the channel bandwidth (e.g., channel bandwidth G, H). The one or more parameters may be referred to as bandwidth dependent parameters for operation in the shared spectrum.

At block 620, the wireless device may perform a first listen before talk (LBT) procedure on the first channel bandwidth according to at least one parameter of the set of parameters. The operations of block 620 may be performed according to the methods described herein. In some examples, the wireless device may perform an LBT procedure (e.g., LBT procedure 310, 320) such as a CAT4 LBT procedure. The wireless device may use a CW that is dependent on the channel bandwidth for the LBT procedure. In an aspect, the at least one parameter may comprise a CWmin. Accordingly, the CW for the LBT procedure may be set as the CWmin for the first or initial transmission attempt on the channel bandwidth.

At block 630, the wireless device may, responsive to a successful first LBT procedure, transmit on the first channel bandwidth during a first channel occupancy time (COT) according to at least one other parameter of the set of parameters. The operations of block 630 may be performed according to the methods described herein. In some examples, the at least one other parameter may comprise a COT duration. The wireless device may transmit (e.g., transmission 314, 324) over the channel bandwidth (e.g., channel bandwidth G, H) for a COT (e.g., COT 312, 322). In an aspect, the COT duration may be dependent on the channel bandwidth. For example, the COT duration (e.g., COT 322) of a wider channel bandwidth (e.g., 60 MHz channel) may be shorter than the COT duration (e.g., COT 312) of a narrower channel bandwidth (e.g., 20 MHz channel).

In another aspect, the wireless device may have performed a successful LBT procedure for a predetermined N times within an interval. Accordingly, the wireless device may have acquired N COTs within the interval. In this regard, the wireless device may be able to switch to a wider channel bandwidth (i.e., from channel bandwidth G to channel bandwidth H) for the next transmission opportunity.

In FIG. 7, a method 700 for supporting flexible channel in a shared spectrum is provided. The operations of the method 700 may be implemented by a UE 115 or its components as described herein with reference to FIGS. 11-12. In some examples, a UE 115 may execute a set of codes to control the functional elements of the device to perform the functions described below. Additionally, the UE 115 may perform aspects of the functions described below using special-purpose hardware. Alternatively, the operations of the method 700 may be implemented by a base station 105 or its components as described herein with reference to FIGS. 9-10. In some examples, a base station 105 may execute a set of codes to control the functional elements of the device to perform the functions described below. Additionally, the base station 105 may perform aspects of the functions described below using special-purpose hardware. It is noted that the method 700 may be combined with the method 600 in FIG. 6.

At block 710, a wireless device (e.g., UE 115 or base station 105) may, responsive to an unsuccessful first LBT procedure, switch to a second channel bandwidth narrower than the first channel bandwidth. The operations of block 710 may be performed according to the methods described herein. In some examples, the wireless device may determine that the channel is busy (e.g., slot 416, 422), and thus may result in an unsuccessful LBT procedure over a first bandwidth (e.g., channel bandwidth E). Accordingly, the wireless device may switch its channel access over a second channel bandwidth (e.g., channel bandwidth F). In an aspect, the wireless device may decide to switch if it has reached a predetermined number of busy slots during the LBT procedure. For example, the wireless device may switch to a narrower channel bandwidth (e.g., channel bandwidth F) after two busy slots (e.g., slot 416, 422) as described in FIG. 4. In another aspect, the wireless device may decide to switch to a narrower channel bandwidth after reaching a maximum of transmission attempts.

At block 720, the wireless device may determine a second set of parameters associated with operation in the shared spectrum. In an aspect, the second set of parameters may be based on the second channel bandwidth. The operations of block 720 may be performed according to the methods described herein. In some examples, the wireless device may determine one or more parameters associated with an LBT procedure (e.g., LBT procedure 310, 320, 430) and a COT duration (e.g., COT 312, 322, 438). The one or more parameters may be dependent on the channel bandwidth (e.g., channel bandwidth G, H in FIG. 3). The one or more parameters may be referred to as bandwidth dependent parameters for operation in the shared spectrum.

At block 730, the wireless device may perform a second LBT procedure on the second bandwidth according to at least one parameter of the second set of parameters. The operations of block 730 may be performed according to the methods described herein. In some examples, the wireless device may perform an LBT procedure (e.g., LBT procedure 310, 320) such as a CAT4 LBT procedure. The wireless device may use a CW that is dependent on the channel bandwidth for the LBT procedure. In an aspect, the at least one parameter may comprise a CWmin. Accordingly, the CW for the LBT procedure may be set as the CWmin for the first or initial transmission attempt on the channel bandwidth.

At block 740, the wireless device may, responsive to a successful second LBT procedure, transmit on the second channel bandwidth during a second COT according to at least one other parameter of the second set of parameters. The operations of block 740 may be performed according to the methods described herein. In some examples, the at least one other parameter may comprise a COT duration. The wireless device may transmit (e.g., transmission 314, 324) over the channel bandwidth (e.g., channel bandwidth G, H) for a COT (e.g., COT 312, 322). In an aspect, the COT duration may be dependent on the channel bandwidth. For example, the COT duration (e.g., COT 322) of a wider channel bandwidth (e.g., 60 MHz channel) may be shorter than the COT duration (e.g., COT 312) of a narrower channel bandwidth (e.g., 20 MHz channel).

Figure 8:
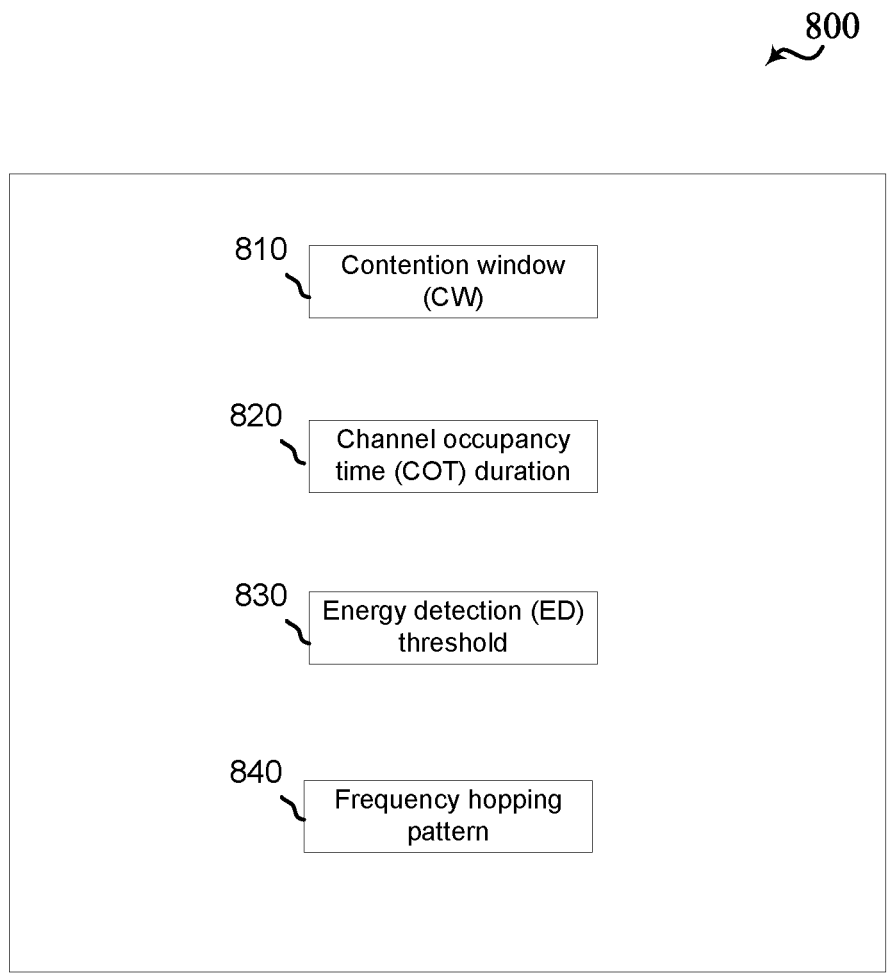
FIG. 8 illustrates a block diagram of operating parameters for supporting flexible channel access in a shared spectrum in accordance with aspects of the present disclosure.

FIG. 8 illustrates a block diagram of operating parameters 800 for supporting flexible channel access in a shared spectrum. In an aspect, the operating parameters 800 may be employed by a base station (e.g., base station 105 in FIG. 1) for flexible channel access in the shared spectrum. In another aspect, the operating parameters 800 may be provided by the base station for configuring its served UEs (e.g., UE 115 in FIG. 1) for flexible channel access in the shared spectrum. One or more of the operating parameters 800 may be provided via explicit signaling or may be determined implicitly based on the channel access scheme (e.g., channel access scheme 200, 300, 400 in FIGS. 2, 3, 4, respectively) that is employed. It is noted that the values specified below for the operating parameters 800 are mere examples, and that other values may be specified as well.

In some examples, the operating parameters 800 may include a contention window (CW) parameter 810. In an aspect, the CW parameter 810 may be dependent on a channel bandwidth, and may be used for an LBT procedure over the channel bandwidth. More specifically, the CW parameter 810 may indicate a CWmin for setting the CW for an LBT procedure in the first or initial transmission attempt as was described in FIG. 3. For example, a CWmin=5 may be employed for an LBT procedure over a 60 MHz channel, and a CWmin=15 may be employed for an LBT procedure over a 20 MHz channel.

In some other examples, the operating parameters 800 may include a COT duration parameter 820. The COT duration parameter 820 may be dependent on a channel bandwidth. In an aspect, the COT duration parameter 820 may indicate a maximum channel occupancy time (MCOT). For example, the COT duration may be equal to 6 ms for transmission on a 20 MHz channel, and the COT duration may be equal to 2 ms for a transmission on a 60 MHz channel as was described in FIG. 3.

In still other examples, the operating parameters 800 may include an ED threshold parameter 830. The ED threshold parameter 830 may specify an ED threshold that is used in an LBT procedure. In an aspect, the ED threshold parameter 830 may be dependent on whether frequency hopping is activated/deactivated within a COT as described in FIG. 2. For example, the ED threshold used for an LBT procedure (e.g., LBT procedure 210) that is associated with a transmission with frequency hopping (e.g., resource allocation 212, 214, 216, 218) may be different than the ED threshold used for the LBT procedure (e.g., LBT procedure 220) that is associated with a transmission without frequency hopping (e.g., transmission bandwidth 224). In another aspect, the ED threshold parameter 830 may be dependent on an LBT procedure associated with a channel bandwidth and/or transmission bandwidth different from the channel bandwidth.

In other examples, the operating parameters 800 may include a frequency hopping (FH) pattern parameter 840. The FH pattern parameter 840 may indicated a FH pattern employed for a COT. In an aspect, the FH pattern may occupy the entire channel bandwidth. In other aspects, the FH pattern may occupy a portion of the channel bandwidth. In still other aspects, the FH pattern may be modified based on whether a collision has occurred or not as was described in FIG. 2. For example, the FH pattern may be modified by changing the hopping location (e.g., frequency) location. In other examples, the FH pattern may be modified by changing the transmission bandwidth of the resource allocation. In still other examples, the FH pattern may be modified by changing both the hopping location and the transmission bandwidth.

Figure 9:
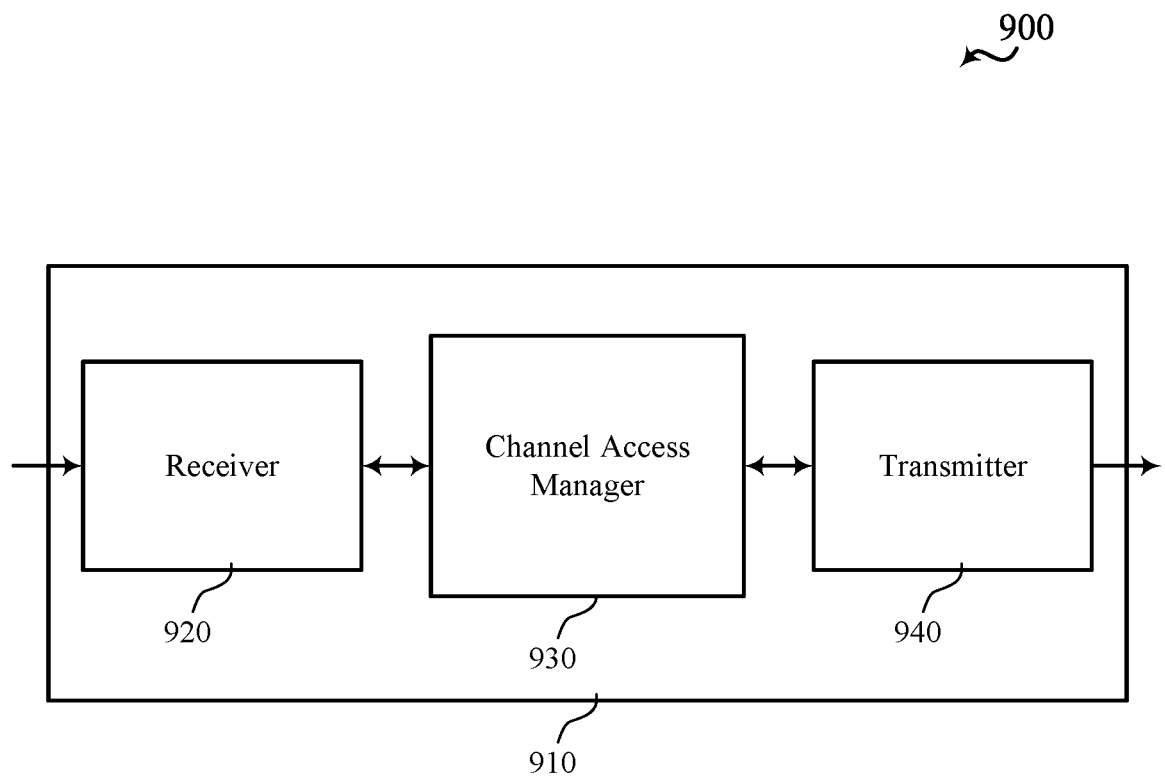
FIG. 9 illustrates a block diagram of a device that supports flexible channel access in a shared spectrum in accordance with aspects of the present disclosure.

FIG. 9 shows a block diagram 900 of a wireless device 910 that supports flexible channel access in a shared spectrum in accordance with aspects of the present disclosure. Wireless device 910 may be an example of aspects of a base station 105 as described herein. Wireless device 910 may include a receiver 920, channel access manager 930, and transmitter 940. Wireless device 910 may also include a processor. Each of these components may be in communication with one another (e.g., via one or more buses).

Receiver 920 may receive information such as packets, user data, or control information associated with various uplink channels such as PUCCH, PUSCH, PRACH, DM-RS, SRS, SR, and the like. Information may be passed on to other components of the device. The receiver 920 may be an example of aspects of the transceiver 1035 described with reference to FIG. 10. The receiver 920 may utilize a single antenna or a set of antennas.

The channel access manager 930 may be an example of aspects of channel access manager 1015 described with reference to FIG. 10.

The channel access manager 930 and/or at least some of its various sub-components may be implemented in hardware, software executed by a processor, firmware, or any combination thereof. If implemented in software executed by a processor, the functions of the channel access manager 930 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The channel access manager 930 and/or at least some of its various sub-components may be physically located at various positions, including being distributed such that portions of functions are implemented at different physical locations by one or more physical devices. In some examples, the channel access manager 930 and/or at least some of its various sub-components may be a separate and distinct component in accordance with various aspects of the present disclosure. In other examples, the channel access manager 930 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The channel access manager 930 may manage one or more channel access parameters (e.g., parameters 800) for operating in the shared spectrum as was described in FIG. 8. Additionally, the channel access manager 930 may be configured to perform the steps in the methods 500, 600, 700 in FIGS. 5, 6, and 7, respectively.

In an aspect, the channel access manager 930 may be configured to perform a listen before talk (LBT) procedure on a channel bandwidth using an energy detection (ED) threshold. The ED threshold may be associated with a transmission bandwidth that is narrower than the channel bandwidth. The channel access manager 930 may also be configured to, responsive to a successful LBT procedure, transmit on the transmission bandwidth according to a frequency hopping pattern during a channel occupancy time (COT). The frequency hopping pattern may comprise a first resource allocation and a second resource allocation different from the first resource allocation.

In another aspect, the channel access manager 930 may be configured to determine a set of parameters associated with operation in a shared spectrum. The set parameters may be based on a channel bandwidth. The channel access manager 930 may be configured to perform a listen before talk (LBT) procedure on the channel bandwidth according to at least one parameter of the set of parameters, and to, responsive to a successful first LBT procedure, transmit on the channel bandwidth during a channel occupancy time (COT) according to at least one other parameter of the set of parameters.

Transmitter 940 may transmit signals generated by other components of the device. In some examples, the transmitter 940 may be collocated with a receiver 920 in a transceiver module. For example, the transmitter 940 may be an example of aspects of the transceiver 1035 described with reference to FIG. 10. The transmitter 940 may utilize a single antenna or a set of antennas.

Transmitter 940 may transmit information such as packets, user data, or control information associated downlink signals/channels such as such as DRS, SSB, DM-RS, PBCH, PDCCH, PDSCH, and the like. In some examples, the transmitter 940 may transmit the configuration for supporting flexible channel access as described herein.

Figure 10:
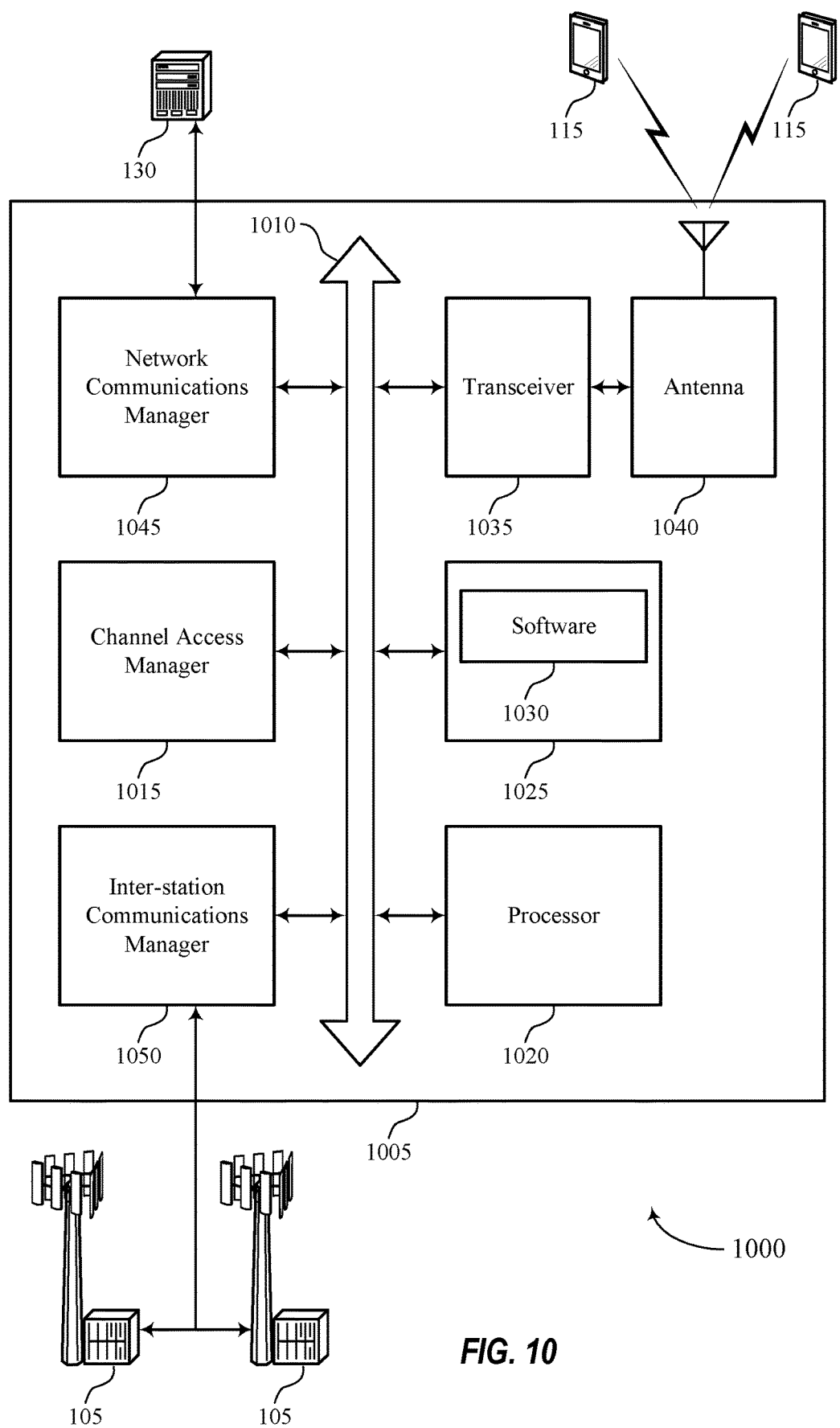
FIG. 10 illustrates a block diagram of a system including a base station that supports flexible channel access in a shared spectrum in accordance with aspects of the present disclosure.

FIG. 10 shows a diagram of a system 1000 including a device 1005 that supports flexible channel access in a shared spectrum in accordance with aspects of the present disclosure. Device 1005 may be an example of or include the components of wireless device 910 or a base station 105 as described herein. Device 1005 may include components for bi-directional voice and data communications including components for transmitting and receiving communications, including channel access manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more user equipment (UE)s 115.

The channel access manager 1015 may manage the channel access schemes (200, 300, 400) as described in various aspects and examples herein. For example, the channel access manager 1015 may maintain the operating parameters (e.g., parameters 800 in FIG. 8) for accessing the shared spectrum and manage various procedures to support flexible channel access in a shared spectrum as described herein in FIGS. 2-8.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting UE-to-UE COT sharing a shared spectrum).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support long term channel sensing in a shared spectrum. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an NR wireless communication network technology to provide communication between base stations 105.

Figure 11:
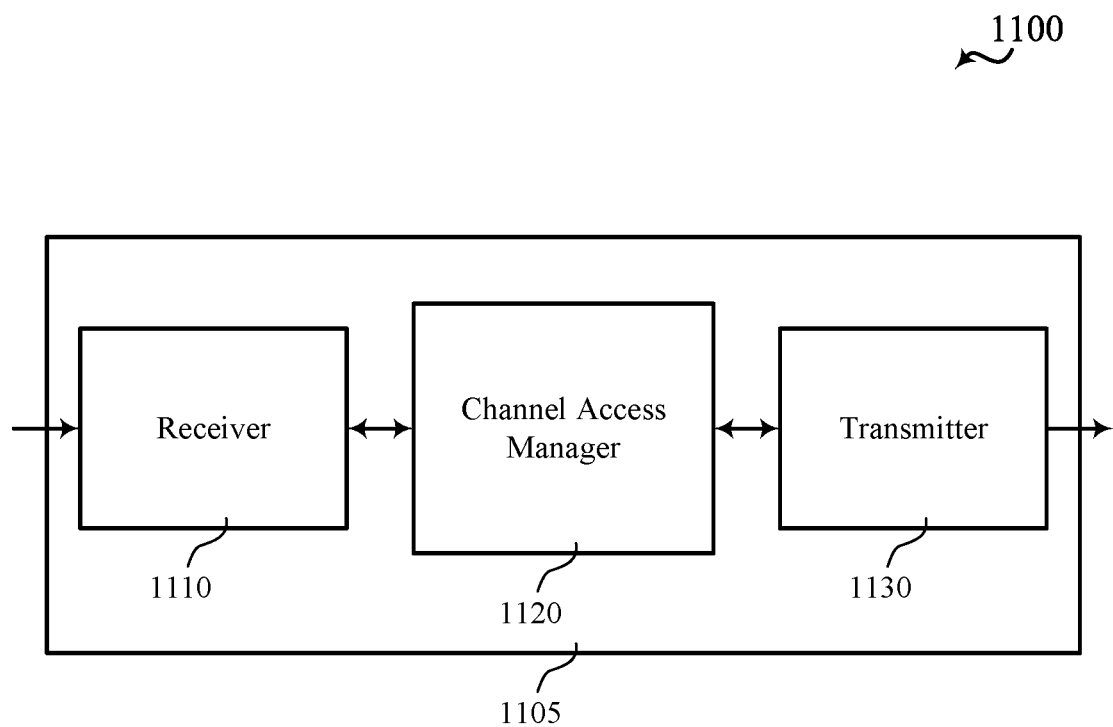
FIG. 11 illustrates a block diagram of a device that supports flexible channel access in a shared spectrum in accordance with aspects of the present disclosure.

FIG. 11 shows a block diagram 1100 of a wireless device 1105 that supports flexible channel access in a shared spectrum in accordance with aspects of the present disclosure. Wireless device 1105 may be an example of aspects of a UE 115 as described herein. Wireless device 1105 may include receiver 1110, channel access manager 1120, and transmitter 1130. Wireless device 1105 may also include a processor. Each of these components may be in communication with one another (e.g., via one or more buses).

Receiver 1110 may receive information such as packets, user data, or control information associated downlink signals/channels such as such as DRS, SSB, DM-RS, PBCH, PDCCH, PDSCH, and the like. Information may be passed on to other components of the device. The receiver 1110 may be an example of aspects of the transceiver 1235 described with reference to FIG. 12. The receiver 1110 may utilize a single antenna or a set of antennas.

The channel access manager 1120 may be an example of aspects of channel access manager 1215 described with reference to FIG. 12.

The channel access manager 1120 and/or at least some of its various sub-components may be implemented in hardware, software executed by a processor, firmware, or any combination thereof. If implemented in software executed by a processor, the functions of the channel access manager 1120 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The channel access manager 1120 and/or at least some of its various sub-components may be physically located at various positions, including being distributed such that portions of functions are implemented at different physical locations by one or more physical devices. In some examples, the channel access manager 1120 and/or at least some of its various sub-components may be a separate and distinct component in accordance with various aspects of the present disclosure. In other examples, the channel access manager 1120 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The channel access manager 1120 may manage and implement configuration parameters (e.g., parameters 800 in FIG. 8) to support flexible channel access as described in FIGS. 2-7. The channel access manager 1120 may receive the parameters via a DCI message, RRC message, or MAC-CE. In some examples, the channel access manager 1120 may employ one or more of the channel access schemes 200, 300, 400 as described herein. In other examples, the channel access manager 1120 may be configured to perform the steps in the methods 500, 600, 700 in FIGS. 5, 6, and 7, respectively.

In an aspect, the channel access manager 1120 may be configured to perform a listen before talk (LBT) procedure on a channel bandwidth using an energy detection (ED) threshold. The ED threshold may be associated with a transmission bandwidth that is narrower than the channel bandwidth. The channel access manager 1120 may also be configured to, responsive to a successful LBT procedure, transmit on the transmission bandwidth according to a frequency hopping pattern during a channel occupancy time (COT). The frequency hopping pattern may comprise a first resource allocation and a second resource allocation different from the first resource allocation.

In another aspect, the channel access manager 1120 may be configured to determine a set of parameters associated with operation in a shared spectrum. The set parameters may be based on a channel bandwidth. The channel access manager 1120 may be configured to perform a listen before talk (LBT) procedure on the channel bandwidth according to at least one parameter of the set of parameters, and to, responsive to a successful first LBT procedure, transmit on the channel bandwidth during a channel occupancy time (COT) according to at least one other parameter of the set of parameters.

Transmitter 1130 may transmit signals generated by other components of the device. The transmitter 1130 may transmit information such as packets, user data, or control information associated with various uplink channels such as PUCCH, PUSCH, PRACH, DM-RS, SRS, SR, and the like. In some examples, the transmitter 1130 may be collocated with a receiver 1110 in a transceiver module. For example, the transmitter 1130 may be an example of aspects of the transceiver 1235 described with reference to FIG. 12. The transmitter 1130 may utilize a single antenna or a set of antennas.

Figure 12:
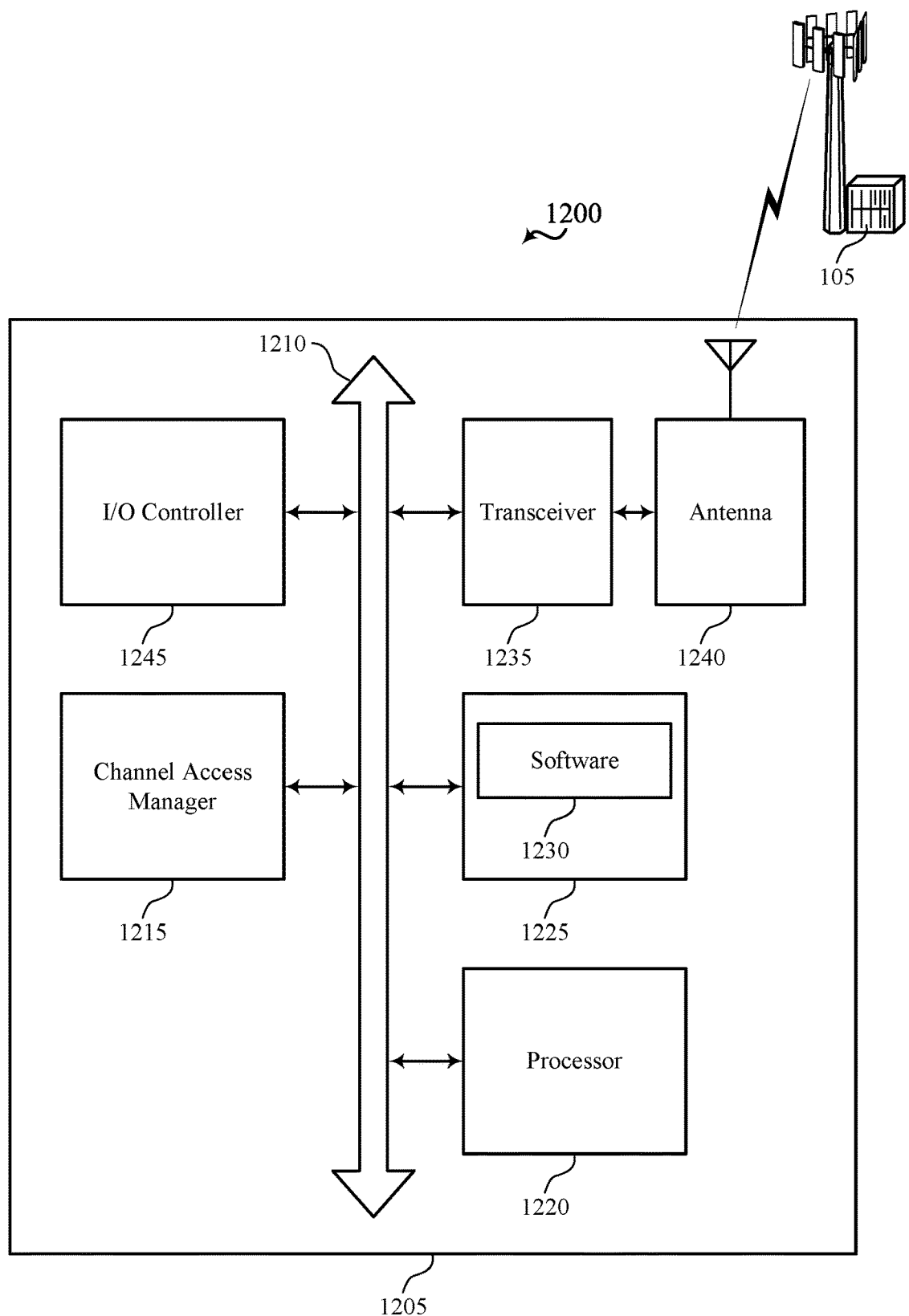
FIG. 12 illustrates a block diagram of a system including a UE that supports flexible channel access in a shared spectrum in accordance with aspects of the present disclosure.

FIG. 12 shows a diagram of a system 1200 including a device 1205 that supports UE-to-UE COT sharing in a shared spectrum in accordance with aspects of the present disclosure. Device 1205 may be an example of or include the components of UE 115 as described above herein. Device 1205 may include components for bi-directional voice and data communications including components for transmitting and receiving communications, including channel access manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

The channel access manager 1215 may maintain configuration parameters (e.g., parameters 800 in FIG. 8) and manage various procedures to support flexible channel access in a shared spectrum as described herein in FIGS. 2-7.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting operation with multiple BW parts in a shared spectrum).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support multiple BW parts a shared spectrum. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

It should be noted that the methods described above describe possible implementations, and that the operations and the steps may be rearranged or otherwise modified and that other implementations are possible. Furthermore, aspects from two or more of the methods may be combined.

Further aspects of the present disclosure include the following:

1. A non-transitory computer-readable medium storing code for wireless communications, the code comprising instructions executable to:

perform a first listen before talk (LBT) procedure on a channel bandwidth using a first energy detection (ED) threshold, the first ED threshold being associated with a transmission bandwidth that is narrower than the channel bandwidth; and responsive to a successful first LBT procedure, transmit on the transmission bandwidth according to a frequency hopping pattern during a first channel occupancy time (COT), the frequency hopping pattern comprising a first resource allocation and a second resource allocation different from the first resource allocation.

2. The non-transitory computer-readable medium of clause 1, wherein the code further comprises instructions executable to:

perform a second LBT procedure on the channel bandwidth using a second ED threshold, the second ED threshold being associated with the channel bandwidth and different from the first ED threshold; and responsive to a successful second LBT procedure, transmit on the channel bandwidth without frequency hopping during a second COT, the second COT being different from the first COT.

3. The non-transitory computer-readable medium of clause 2, wherein the first ED threshold is greater than the second ED threshold.

4. The non-transitory computer-readable medium of clause 2, wherein the instructions executable to transmit on the transmission bandwidth uses a same power spectral density limit as the instructions executable to transmit on the channel bandwidth.

5. The non-transitory computer-readable medium of clause 2, wherein the frequency hopping pattern occupies a portion of the channel bandwidth.

6. The non-transitory computer-readable medium of clause 5, wherein the transmission bandwidth is narrower than the channel bandwidth by a predetermined threshold;

wherein the first LBT procedure comprises an LBT exempt procedure.

7. The non-transitory computer-readable medium of clause 1, wherein the code further comprises instructions executable to determine whether a collision has occurred with respect to at least one of the first resource allocation or the second resource allocation.

8. The non-transitory computer-readable medium of clause 7, wherein the code further comprises instructions executable to, responsive to a determination that the collision has occurred, adjust a contention window for a subsequent LTB procedure to be performed on the channel bandwidth.

9. The non-transitory computer-readable medium of clause 7, wherein the code further comprises instructions executable to, responsive to a determination that the collision has occurred, modify the frequency hopping pattern for a subsequent COT.

10. The non-transitory computer-readable medium of clause 9, wherein the instructions executable to modify the frequency hopping pattern comprises at least one of:

instructions executable to change a hopping location of at least one of the first resource allocation or the second resource allocation; or instructions executable to change the transmission bandwidth associated with at least one of the first resource allocation or the second resource allocation.

11. The non-transitory computer-readable medium of clause 1, wherein each of the first and second resource allocation is associated with at least one of a scheduled uplink grant, a configured uplink grant, a scheduled downlink assignment, or a semi-persistent downlink assignment.

12. A non-transitory computer-readable medium storing code for wireless communications, the code comprising instructions executable to:

determine a first set of parameters associated with operation in a shared spectrum, the first set parameters being based on a first channel bandwidth;

perform a first listen before talk (LBT) procedure on the first channel bandwidth according to at least one parameter of the first set of parameters; and responsive to a successful first LBT procedure, transmitting on the first channel bandwidth during a first channel occupancy time (COT) according to at least one other parameter of the first set of parameters.

13. The non-transitory computer-readable medium of clause 12, wherein the at least one parameter is associated with a contention window size.

14. The non-transitory computer-readable medium of clause 12, wherein the at least one other parameter comprises a duration of the COT.

15. The non-transitory computer-readable medium of clause 12, wherein the code further comprises instructions executable to:

responsive to an unsuccessful first LBT procedure, switch to a second channel bandwidth narrower than the first channel bandwidth;

determine a second set of parameters associated with operation in the shared spectrum, the second set of parameters being based on the second channel bandwidth;

perform a second LBT procedure on the second channel bandwidth according to at least one parameter of the second set of parameters; and responsive to a successful second LBT procedure, transmit on the second channel bandwidth during a second COT according to at least one other parameter of the second set of parameters.

16. The non-transitory computer-readable medium of clause 15, wherein the unsuccessful first LBT procedure comprises detection of a predetermined number of busy slots during the first LBT procedure.

17. The non-transitory computer-readable medium of clause 12, wherein the instructions executable to perform the first LBT is successful for a predetermined number of times within an interval;

wherein the code further comprises instructions executable to switch to a second channel bandwidth wider than the first channel bandwidth for a subsequent channel access.

18. An apparatus for wireless communications, comprising:

means for performing a first listen before talk (LBT) procedure on a channel bandwidth using a first energy detection (ED) threshold, the first ED threshold being associated with a transmission bandwidth that is narrower than the channel bandwidth; and responsive to a successful first LBT procedure, means for transmitting on the transmission bandwidth according to a frequency hopping pattern during a first channel occupancy time (COT), the frequency hopping pattern comprising a first resource allocation and a second resource allocation different from the first resource allocation.

19. The apparatus of clause 18, further comprising:
means for performing a second LBT procedure on the channel bandwidth using a second ED threshold, the second ED threshold being associated with the channel bandwidth and different from the first ED threshold; and responsive to a successful second LBT procedure, means for transmitting on the channel bandwidth without frequency hopping during a second COT, the second COT being different from the first COT.

20. The apparatus of clause 19, wherein the first ED threshold is greater than the second ED threshold.

21. The apparatus of clauses 19-20, wherein the means for transmitting on the transmission bandwidth uses a same power spectral density limit as the means for transmitting on the channel bandwidth.

22. The apparatus of clauses 18-21, wherein the frequency hopping pattern occupies a portion of the channel bandwidth.

23. The apparatus of clause 22, wherein the transmission bandwidth is narrower than the channel bandwidth by a predetermined threshold;
wherein the first LBT procedure comprises an LBT exempt procedure.

24. The apparatus of clauses 18-21, further comprising means for determining whether a collision has occurred with respect to at least one of the first resource allocation or the second resource allocation.

25. The apparatus of clause 24, further comprising, responsive to a determination that the collision has occurred, means for adjusting a contention window for a subsequent LTB procedure to be performed on the channel bandwidth.

26. The apparatus of clause 24, further comprising, responsive to a determination that the collision has occurred, means for modifying the frequency hopping pattern for a subsequent COT.

27. The apparatus of clause 26, wherein the means for modifying the frequency hopping pattern comprises at least one of:
means for changing a hopping location of at least one of the first resource allocation or the second resource allocation; or means for changing the transmission bandwidth associated with at least one of the first resource allocation or the second resource allocation.

28. The apparatus of clauses 18-27, wherein each of the first and second resource allocation is associated with at least one of a scheduled uplink grant, a configured uplink grant, a scheduled downlink assignment, or a semi-persistent downlink assignment.

29. An apparatus for wireless communications, comprising:
means for determining a first set of parameters associated with operation in a shared spectrum, the first set parameters being based on a first channel bandwidth;
means for performing a first listen before talk (LBT) procedure on the first channel bandwidth according to at least one parameter of the first set of parameters; and
responsive to a successful first LBT procedure, means for transmitting on the first channel bandwidth during a first channel occupancy time (COT) according to at least one other parameter of the first set of parameters.

30. The apparatus of clause 29, wherein the at least one parameter is associated with a contention window size.

31. The apparatus of clauses 29-30, wherein the at least one other parameter comprises a duration of the COT.

32. The apparatus of clauses 29-31, further comprising:
responsive to an unsuccessful first LBT procedure, means for switching to a second channel bandwidth narrower than the first channel bandwidth;
means for determining a second set of parameters associated with operation in the shared spectrum, the second set of parameters being based on the second channel bandwidth;
means for performing a second LBT procedure on the second channel bandwidth according to at least one parameter of the second set of parameters; and responsive to a successful second LBT procedure, means for transmitting on the second channel bandwidth during a second COT according to at least one other parameter of the second set of parameters.

33. The apparatus of clause 32, further comprising means for detecting a predetermined number of busy slots during the unsuccessful first LBT procedure.

34. The apparatus of clauses 29-31, wherein the means for performing the first LBT is successful for a predetermined number of times within an interval;
the apparatus further comprising means for switching to a second channel bandwidth wider than the first channel bandwidth for a subsequent channel access.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNB s, relay base stations, and the like. There may be overlapping geographic coverage areas for different technologies.

The downlink transmissions described herein may also be called forward link transmissions while the uplink transmissions may also be called reverse link transmissions. Each communication link described herein—including, for example, wireless communications system 100 and FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
performing a first listen before talk (LBT) procedure on a channel bandwidth using a first energy detection (ED) threshold, the first ED threshold being associated with a transmission bandwidth that is narrower than the channel bandwidth;
responsive to a successful first LBT procedure, transmitting on the transmission bandwidth according to a frequency hopping pattern during a first channel occupancy time (COT), the frequency hopping pattern comprising a first resource allocation and a second resource allocation different from the first resource allocation;
performing a second LBT procedure on the channel bandwidth using a second ED threshold, the second ED threshold being associated with the channel bandwidth and different from the first ED threshold; and
responsive to a successful second LBT procedure, transmitting on the channel bandwidth without frequency hopping during a second COT, the second COT being different from the first COT.

2. The method of claim 1, wherein the first ED threshold is greater than the second ED threshold.

3. The method of claim 1, wherein the transmitting on the transmission bandwidth uses a same power spectral density limit as the transmitting on the channel bandwidth.

4. The method of claim 1, wherein the frequency hopping pattern occupies a portion of the channel bandwidth.

5. The method of claim 4, wherein the transmission bandwidth is narrower than the channel bandwidth by a predetermined threshold;
wherein the first LBT procedure comprises an LBT exempt procedure.

6. The method of claim 1, further comprising determining whether a collision has occurred with respect to at least one of the first resource allocation or the second resource allocation.

7. The method of claim 6, further comprising, responsive to determining that the collision has occurred, adjusting a contention window for a subsequent LTB procedure to be performed on the channel bandwidth.

8. The method of claim 6, further comprising, responsive to determining that the collision has occurred, modifying the frequency hopping pattern for a subsequent COT.

9. The method of claim 8, wherein the modifying the frequency hopping pattern comprises at least one of:
changing a hopping location of at least one of the first resource allocation or the second resource allocation; or
changing the transmission bandwidth associated with at least one of the first resource allocation or the second resource allocation.

10. A method of wireless communications, comprising:
determining a first set of parameters associated with operation in a shared spectrum, the first set parameters being based on a first channel bandwidth;
performing a first listen before talk (LBT) procedure on the first channel bandwidth according to at least one parameter of the first set of parameters;
responsive to a successful first LBT procedure, transmitting on the first channel bandwidth during a first channel occupancy time (COT) according to at least one other parameter of the first set of parameters;
responsive to an unsuccessful first LBT procedure, switching to a second channel bandwidth narrower than the first channel bandwidth;
determining a second set of parameters associated with operation in the shared spectrum, the second set of parameters being based on the second channel bandwidth;
performing a second LBT procedure on the second channel bandwidth according to at least one parameter of the second set of parameters; and
responsive to a successful second LBT procedure, transmitting on the second channel bandwidth during a second COT according to at least one other parameter of the second set of parameters.

11. The method of claim 10, wherein the at least one parameter is associated with a contention window size or a duration of the first COT.

12. The method of claim 10, wherein the unsuccessful first LBT procedure comprises detection of a predetermined number of busy slots during the first LBT procedure.

13. The method of claim 10, wherein the performing the first LBT is successful for a predetermined number of times within an interval;
the method further comprising switching to a second channel bandwidth wider than the first channel bandwidth for a subsequent channel access.

14. A device for wireless communications, comprising:
a processor;
memory in electronic communication with the processor; and
instructions stored in the memory, wherein the instructions are executable by the processor to:
perform a first listen before talk (LBT) procedure on a channel bandwidth using a first energy detection (ED) threshold, the first ED threshold being associated with a transmission bandwidth that is narrower than the channel bandwidth,
responsive to a successful first LBT procedure, transmit on the transmission bandwidth according to a frequency hopping pattern during a first channel occupancy time (COT), the frequency hopping pattern comprising a first resource allocation and a second resource allocation different from the first resource allocation,
perform a second LBT procedure on the channel bandwidth using a second ED threshold, the second ED threshold being associated with the channel bandwidth and different from the first ED threshold, and
responsive to a successful second LBT procedure, transmit on the channel bandwidth without frequency hopping during a second COT, the second COT being different from the first COT.

15. The device of claim 14, wherein the first ED threshold is greater than the second ED threshold.

16. The device of claim 14, wherein the instructions executable by the processor to transmit on the transmission bandwidth uses a same power spectral density limit as the instructions executable by the processor to transmit on the channel bandwidth.

17. The device of claim 14, wherein the frequency hopping pattern occupies a portion of the channel bandwidth.

18. The device of claim 17, wherein the transmission bandwidth is narrower than the channel bandwidth by a predetermined threshold;
wherein the first LBT procedure comprises an LBT exempt procedure.

19. The device of claim 14, wherein the instructions are further executable by the processor to determine whether a collision has occurred with respect to at least one of the first resource allocation or the second resource allocation.

20. The device of claim 19, wherein the instructions are further executable by the processor to, responsive to a determination that the collision has occurred, adjust a contention window for a subsequent LTB procedure to be performed on the channel bandwidth.

21. The device of claim 19, wherein the instructions are further executable by the processor to, responsive to a determination that the collision has occurred, modify the frequency hopping pattern for a subsequent COT.

22. The device of claim 21, wherein the instructions executable by the processor to modify the frequency hopping pattern comprises at least one of:
   instructions executable by the processor to change a hopping location of at least one of the first resource allocation or the second resource allocation; or
   instructions executable by the processor to change the transmission bandwidth associated with at least one of the first resource allocation or the second resource allocation.

23. A device for wireless communications, comprising:
   a processor;
   memory in electronic communication with the processor; and
   instructions stored in the memory, wherein the instructions are executable by the processor to:
      determine a first set of parameters associated with operation in a shared spectrum, the first set parameters being based on a first channel bandwidth,
      perform a first listen before talk (LBT) procedure on the first channel bandwidth according to at least one parameter of the first set of parameters,
      responsive to a successful first LBT procedure, transmit on the first channel bandwidth during a first channel occupancy time (COT) according to at least one other parameter of the first set of parameters,
      responsive to an unsuccessful first LBT procedure, switch to a second channel bandwidth narrower than the first channel bandwidth,
      determine a second set of parameters associated with operation in the shared spectrum, the second set of parameters being based on the second channel bandwidth;
      perform a second LBT procedure on the second channel bandwidth according to at least one parameter of the second set of parameters, and
      responsive to a successful second LBT procedure, transmit on the second channel bandwidth during a second COT according to at least one other parameter of the second set of parameters.

24. The device of claim 23, wherein the at least one parameter is associated with a contention window size or a duration of the first COT.

25. The device of claim 23, wherein instructions are further executable by the processor to detect a predetermined number of busy slots during the unsuccessful first LBT procedure.

26. The device of claim 23, wherein the instructions executable by the processor to perform the first LBT is successful for a predetermined number of times within an interval;
   wherein the instructions are further executable by the processor to switch to a second channel bandwidth wider than the first channel bandwidth for a subsequent channel access.

* * * * *